US012761478B1

(12) United States Patent
Fard et al.

(10) Patent No.: US 12,761,478 B1
(45) Date of Patent: Oct. 13, 2026

(54) OPTICAL WAVEGUIDE WITH MULTIPLE HOLOGRAPHIC LAYERS

(71) Applicant: Amazon Technologies, Inc., Seattle, WA (US)

(72) Inventors: Erfan M. Fard, Tucson, AZ (US); Chen Liang, Tucson, AZ (US); Arkady Bablumyan, Escondido, CA (US)

(73) Assignee: Amazon Technologies, Inc., Seattle, WA (US)

( * ) Notice: Subject to any disclaimer, the term of this patent is extended or adjusted under 35 U.S.C. 154(b) by 552 days.

(21) Appl. No.: 18/214,896

(22) Filed: Jun. 27, 2023

(51) Int. Cl.
*G02B 27/01* (2006.01)
*G03H 1/02* (2006.01)

(52) U.S. Cl.
CPC ....... *G02B 27/0172* (2013.01); *G03H 1/0272* (2013.01); *G02B 2027/0174* (2013.01); *G03H 2260/12* (2013.01)

(58) Field of Classification Search
CPC .......................... G02B 27/0172; G03H 1/0272
See application file for complete search history.

(56) References Cited

U.S. PATENT DOCUMENTS 11,385,464 B2 7/2022 Kim et al.
12,339,452 B2 6/2025 Mills et al.
2006/0228073 A1 10/2006 Mukawa et al.
2019/0056593 A1 2/2019 Bablumyan
2020/0225498 A1* 7/2020 Potnis .................. G02B 5/1866
2020/0278543 A1 9/2020 Schultz et al.
2023/0213767 A1 7/2023 Grant et al.

OTHER PUBLICATIONS

Esfandyarpour et al., U.S. Appl. No. 18/367,085, "Optical Waveguide With Hybrid Hologram Formed by Holographic Layers of Different Types," Filed Sep. 12, 2023.

* cited by examiner

*Primary Examiner* — James A Dudek
(74) *Attorney, Agent, or Firm* — Kilpatrick Townsend & Stockton LLP

(57) ABSTRACT

Techniques for an optical waveguide with multiple holographic layers are described herein. In an example, a system includes an optical waveguide substrate and a first holographic layer coupled to the optical waveguide substrate. The first holographic layer is configured to diffract a first portion of a light beam at a diffraction angle relative to a surface of the optical waveguide substrate. A remaining portion of the light beam is output from the first holographic layer without being diffracted by the first holographic layer. The system also includes a second holographic layer coupled to the optical waveguide substrate, separated from the first holographic layer by a distance, and configured to receive some or all the remaining portion of the light beam and diffract a second portion of the light beam at the diffraction angle.

20 Claims, 19 Drawing Sheets

Show each hologram

OPTICAL WAVEGUIDE WITH MULTIPLE HOLOGRAPHIC LAYERS

BACKGROUND

Image displays have been utilized in different mixed reality systems such as augmented reality systems that include near eye displays and heads-up displays. In a mixed reality system, an image can be displayed to a user from a light projector onto a light transparent display that allows the user to also view the real world.

BRIEF DESCRIPTION OF THE DRAWINGS

Various embodiments in accordance with the present disclosure will be described with reference to the drawings, in which.

DETAILED DESCRIPTION

Figure 1:
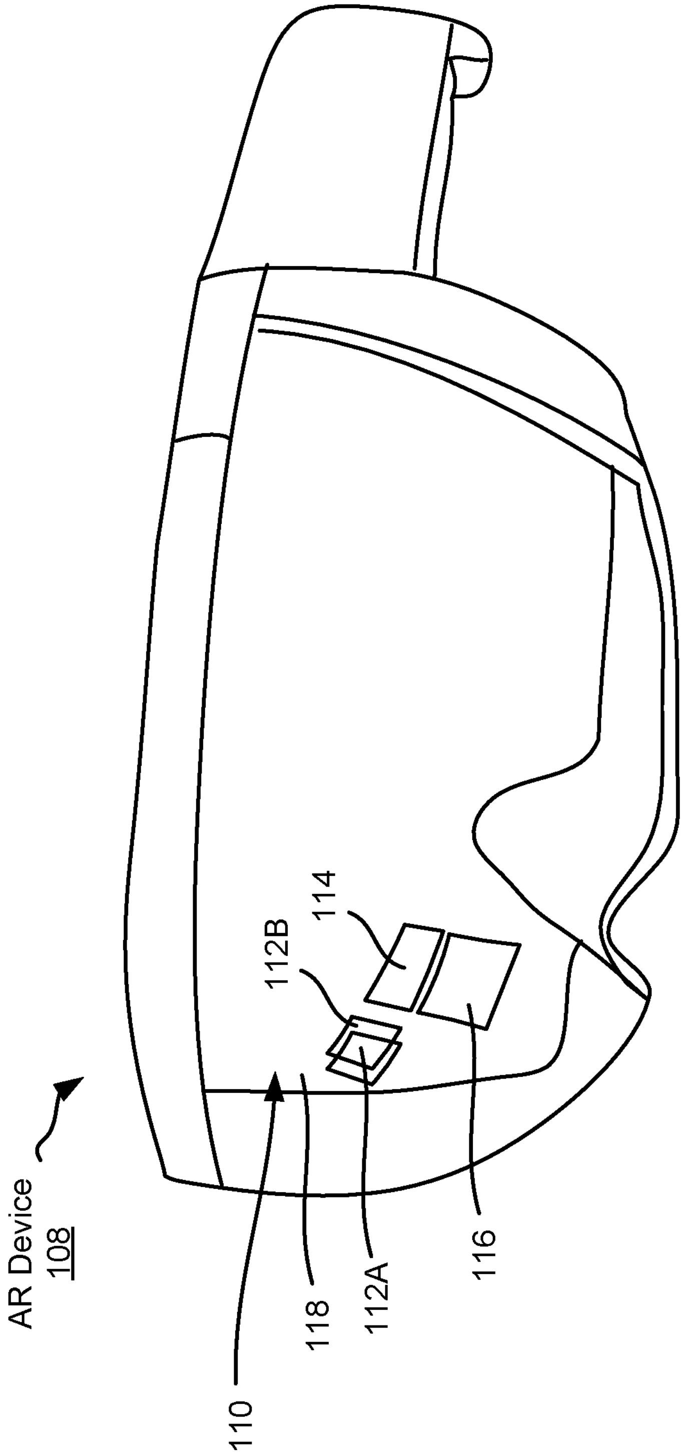
FIG. 1 illustrates an example of a mixed reality device that implements an optical waveguide with multiple holographic layers in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, an optical waveguide with multiple holographic layers. In an example, the optical waveguide can include an optical waveguide substrate and at least two holographic layers that are co-located and coupled to the optical waveguide substrate (e.g., at least two injection holographic layers and, optionally, at least two redirection holographic layers and/or at least two extraction holographic layers). The first holographic layer diffracts a first portion of a light beam at a diffraction angle relative to a surface of the optical waveguide substrate. A remaining portion of the light beam may not be diffracted by the first holographic layer and can propagate towards the second holographic layer. The second holographic layer can then receive the remaining portion of the light beam and diffract some or all of it at the same diffraction angle as the first holographic layer. As such, rather than the remaining portion of the light beam being lost, the second holographic layer diffracts some or all of it. The light beam can represent an image. Because the lights diffracted by the first and second holographic layers are diffracted at the same diffraction angle, the image can be projected without aberration and at a higher brightness in luminosity relative to when only one holographic layer is used.

To illustrate, consider an example of an augmented reality device that implements an optical system of the present disclosure. The augmented reality device can be glasses that include a light projector and a waveguide substrate. The waveguide substrate is coupled to two injection holographic layers, a redirection holographic layer, and an extraction holographic layer. A first injection holographic layer receives light incident from the light projector. The first injection holographic layer injects, at a diffraction angle, a first portion of the light into the waveguide substrate until this first portion reaches the redirection holographic layer. A remaining portion of the light may not be diffracted by the first injection holographic layer and can be output from the first injection holographic layer. The second injection holographic layer can receive this remaining portion and diffract, at the same diffraction angle, a second portion of the light (possibly the remaining portion in its entirety, or a portion thereof) into the waveguide substrate towards the redirection holographic layer. The redirection holographic layer redirects the first portion and the second portion of the light towards the extraction holographic layer. The light reaches the extraction holographic layer, which extracts these two portions as output light for viewing by a user. Each of the first portion and second portion of the light can represent a same image. Because the same diffraction angle is used, the output light can correspond to that same aberration-free image which is substantially brighter in luminosity than an image projected using only the first portion or the second portion. In this illustrative example, adding the second injection holographic layer is beneficial because the input light from the light projector interacts with the first injection holographic layer only once. Any light in the remaining portion is unused. In comparison, for redirection and extraction holographic layers, the light interacts with them multiple times. In such holographic layers, any light in the remaining portion may get diffraction on the next interaction.

Embodiments of the present disclosure provide several technical advantages over conventional optical waveguide systems. For instance, conventional near-eye displays (NEDs) may suffer from low efficiency meaning that the ratio of the amount of light output from the NED to the power in is low (e.g., a percentage of the power in is output). Material absorption within the waveguide and low diffraction efficiencies of holographic elements typically contribute to the low efficiency. The optical waveguide system of the present disclosure stacks multiple layers of injection holograms in a single waveguide layer with an intermediary layer between the injection holograms. This approach may offer a tradeoff between the added material absorption from an additional holographic layer the number of holographic layers, which increases system efficiency. By using a stack of injection holographic layers, the efficiency of the waveguide system may be substantially increased (e.g., by a percentage improvement in the efficiency in one example). For example, the efficiency can be increased by a percentage roughly equal to the diffraction efficiency of the first layer. If the diffraction efficiency of the injection hologram is 50% for layer one, then the second layer would increase the efficiency by "50%×50%=25%." In addition, the leakage of light from an injection holographic layer may be reduced.

For simplicity, the figures show and describe a first holographic layer and a second holographic forming a stack and being used in an optical waveguide system. However, the embodiments are not limited as such, and it should be understood that any number of holographic layers may be used. Generally, a stack of holographic layers is possible. The stack can include two or more holographic layers that can be co-located. In the stack, a portion of light not diffracted by a holographic layer can propagate to a next holographic layer that diffracts at least a portion thereof. In an example, the stacking arranges the holographic layers such that the holographic layers are normal to the light injection angle and are separated by a gap. The gap is used such that two neighboring holographic layers do not form a single contiguous thicker layer. The gap can also be sized such that no total internal reflection (TIR) occurs between the two neighboring layers. Further, various embodiments describe the use of injection holographic layers as the first holographic layer and the second holographic layer. However, the embodiments are not limited as such. Generally, the first holographic layer and the second holographic layer are of a same holographic type and at least partially overlap. The hologram type is one of an injection holographic layer (e.g., each one of the first holographic layer and the second holographic layer is an injection holographic layer), a redirection holographic layer (e.g., each one of the first holographic layer and the second holographic layer is a redirection holographic layer), or an extraction holographic layer (e.g., each one of the first holographic layer and the second holographic layer is an extraction holographic layer).

As used herein, the terms "light" and "optical" are used in their customary ordinary meaning and refer to electromagnetic wave having a wavelength within the visible region of the optical spectrum and, optionally, within a region that neighbors the visible region (a flanking region). Also as used herein, the term "hologram" is used in their customary ordinary meaning and refers to a diffraction pattern-produced by a spatially split coherent beam of radiation (such as a laser beam) in a layer of an optical material. The term "holographic layer" refers to a layer of material containing a hologram recorded therein (in a body or thickness of the layer) and/or as a surface modulation (surface relief) of such layer.

FIG. 1 illustrates an example of a mixed reality device that implements an optical waveguide with multiple holographic layers in accordance with an embodiment of the disclosure. In the example of FIG. 1, the mixed reality device is illustrated as an augmented reality (AR) device 108. However, other types of mixed reality devices are likewise possible, such as heads up displays (HUDs), holographic devices, and the like. Generally, a mixed reality device enables combining images from different sources via an optical waveguide combiner. One source can be the real world, whereby these images are real-world images. Another source can be a virtual world, whereby these images are virtual (or digital) images. A waveguide combiner projects virtual images and allow a viewer to see through the real world for AR and heads-up display (HUD) applications. The waveguide combiner offers the possibility to extend the eye box without sacrificing the field of view. The eye box is the region where the viewer sees the image, and the field of view is the angular extent (size) of the image.

Referring to FIG. 1, the AR device 108 (e.g., its optical combiner) can combine the real-world images with the virtual images. The real world images can be perceived through a see-through lens of the AR device 108. The virtual images can be formed based on light emission from a light projector.

The AR device 108 may include an optical waveguide system 110. The optical waveguide system 110 (or at least the optical waveguide) can span the entirety of a face shield of the AR device 108 or a portion thereof. In an example, the optical waveguide system 110 includes an optical waveguide substrate 118 that propagates a light beam between a light injection surface and a light extraction surface.

In an example, the optical waveguide system 110 includes injection holographic layers 112A-112B coupled to the light injection surface. The injection holographic layers 112A-112B represent a stack of co-located holographic layers that inject different portions of the light beam into the optical waveguide substrate 118 at the same diffraction angle. As used herein, two angles are said to be same when these angles have the same value or substantially the same values. Substantially the same values mean that the difference between the two values is within a tolerance margin and/or error margin that is within a predefined range (e.g., +/−5%) and that does not impact the optical performance of the AR device 108 (e.g., the projected imagery appears to be aberration free to the average human eye). The injection holographic layer 112A can receive the light beam from a light engine along a light projection axis and diffract a first portion of the light beam at a diffraction angle (e.g., this angle can be defined relative to a surface of the optical waveguide substrate 118 and can be an injection angle into the optical waveguide substrate 118). The first portion of the light beam represents a first image (e.g., part of the imagery projected by the light engine). A remaining portion of the light beam can be output from the injection holographic layer 112A without being diffracted by the injection holographic layer 112A. The remaining portion of the light bean can be received by the injection holographic layer 112B, which is separated from the injection holographic layer 112A by some distance (e.g., a gap). At least a portion of the injection holographic layer 112A overlaps with the injection holographic layer 112B (e.g., the overlap is along the light projection axis). The injection holographic layer 112B diffracts a second portion of the light beam at the same diffraction angle relative. The second portion of the light beam represents a second image that is a duplicate of the first image (although the second image may have a different luminosity brightness than the second image depending on the intensity of the second portion of the light beam and the intension of the first portion of the light beam, where such intensities can depend on, for example, the diffraction efficiencies of the holograph layers 112A and 112B).

The first portion of the light beam and the second portion of the light beam can propagate within the optical waveguide substrate 118 by TIR along a first direction until reaching a redirection holographic layer 114 that is coupled to the optical waveguide substrate 118. The redirection holographic layer 114 can redirect the first portion of the light beam and the second portion of the light beam along a second direction, different from the first direction, towards the light extraction surface as a redirected light beam. The first portion of the light beam and the second portion of the light beam can continue propagating within the optical waveguide substrate 118 by total internal reflection until reaching an extraction holographic layer 116 that is coupled to the light extraction surface and extracts the first portion of the light beam and the second portion of the light beam from the optical waveguide substrate 112 as an output light beam. The output light beam can represent an image that is a duplicate of the first image and the second image and that is brighter in luminosity than the first image or the second image individually. Using both injection holographic layers 112A-112B increases efficiency of the optical waveguide system 110, since the remaining portion of light beam that is transmitted through the injection holographic layer 112A and is normally lost can interact with and be diffracted by the injection holographic layer 112B. This second interaction increases the overall efficiency of the optical waveguide system 110 by reducing the amount of light that is otherwise leaked out by the injection holographic layer 112A. By re-coupling a portion of that light into the optical waveguide substrate 118 by total internal reflection using the injection holographic layer 112B, the efficiency of the optical waveguide system 110 is increased.

Although FIG. 1 illustrates two injection holographic layers, a different number of injection holographic layers is possible. For example, this number can be three or more. In another example, this number is one. Further, although FIG. 1 illustrates a single re-direction holographic layer and a single extraction holographic layer, a different number of such holographic layers is possible. For example, two or more re-direction holographic layers and/or two or more extraction holographic layers can be implemented in the AR device 108.

Figure 2:
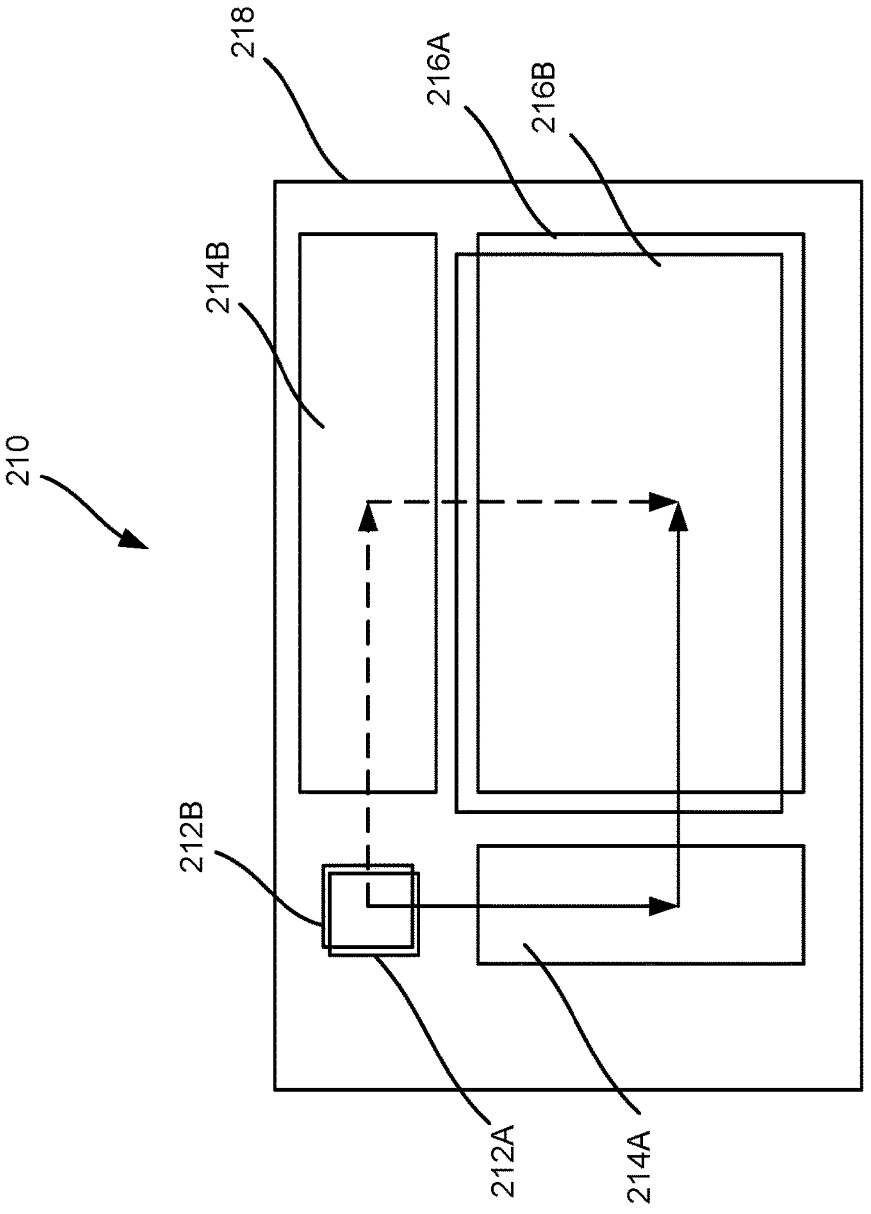
FIG. 2 shows a schematic illustration of a light beam path through an optical waveguide system in accordance with an embodiment of the disclosure.

FIG. 2 shows a schematic illustration of a light beam path through an optical waveguide system 210 in accordance with an embodiment of the disclosure. The optical waveguide system 210 is an example of the optical waveguide system 110 in FIG. 1. The optical waveguide system 210 includes an optical waveguide substrate 218, to which multiple holographic layers are coupled. These layers include at least two injection holographic layers 212A-212B forming a stack, at least one redirection holographic (the figures illustrate two of them with the numerals 214A-214B corresponding to an implementation that provides two light paths), and at least one extraction holographic (the figures also illustrate two of them with the numerals 216A-216B, corresponding to an implementation that provides two light paths In this implementation the two extraction holographic layers 216A-216B form a stack by being at least partially overlapping). As illustrated in FIG. 2, a first light path involves light that is injected into the optical waveguide substrate 218 by the injection holographic layers 212A-212B, directed towards the redirection holographic layer 214A, and redirected to the extraction holographic layers 216A-26B, and extracted from the optical waveguide substrate 218 as output light.

The injection holographic layers 212A-212B are separated from each other by a distance, such that the injection holographic layers 212A-212B do not act as a single injection holographic layer and, thus, increase the efficiency of the optical waveguide system 210. The injection holographic layer 212A may have a different optical property(ies) than the injection holographic layer 212B such any or a combination of different absorption, diffraction efficiency, diffraction index, diffraction grating, diffraction pitch, and/or thickness. Nonetheless, the diffraction angles of the two injection holographic layers 212A-212B are the same along at least one plane. That is, although there are two injection holographic layers, the lights propagated by both of the injection holographic layers 212A-212B follow the same direction along the first light path to the redirection holographic layer 214A. In addition, the redirection holographic layer 214A may be slanted by a certain angle relative to the injection holographic layers 212A-212B (e.g., twenty degrees). So, the light propagating along the first light path towards the extraction holographic layers 216A-216B can be at one-hundred ten degrees relative to the light output from the injection holographic layers 212A-212B.

In an example, the optical waveguide system 210 may include a second light path (indicated by the dashed lines) in addition to the first light path. The two lights path can be different. As illustrated in FIG. 2, whereas the first light path corresponds to a propagation that is vertical and then horizontal, the second light path can correspond to a propagation that is horizontal and then vertical. Further, the first light path involves the redirection holographic layer 214A, whereas the second light path involves the redirection holographic layer 214B. The two redirection holographic layers 214A and 214B do not form a stack by being disposed at different locations such that no overlap may exist between them. In other words, if the optical waveguide system 210 supports multiple light paths and includes multiple redirection holographic layers, the redirection holographic layers may not overlap (as shown in FIG. 2 with the redirection holographic layers 214A-214B).

In an example, the extraction holographic layers 216A-216B may be arranged in a stack. In the stack, the extraction holographic layers 216A-216B separated from each other by a distance, such that the extraction holographic layers 216A-216B do not act as a single extraction holographic layer. The extraction holographic layer 216A may have a different optical property (ies) than the extraction holographic layer 216B such any or a combination of different absorption, diffraction efficiency, diffraction index, diffraction grating, diffraction pitch, and/or thickness. Nonetheless, the diffraction angles of the two extraction holographic layers 216A-216B are the same along at least one plane.

In an example, the injection holographic layers 212A-212B may diffract different wavelengths. For instance, the injection holographic layer 212A may diffract light that is within a first wavelength band (e.g., blue and red) and the injection holographic layer 212B may diffract light that is within a second wavelength band (e.g., red).

Figure 3:
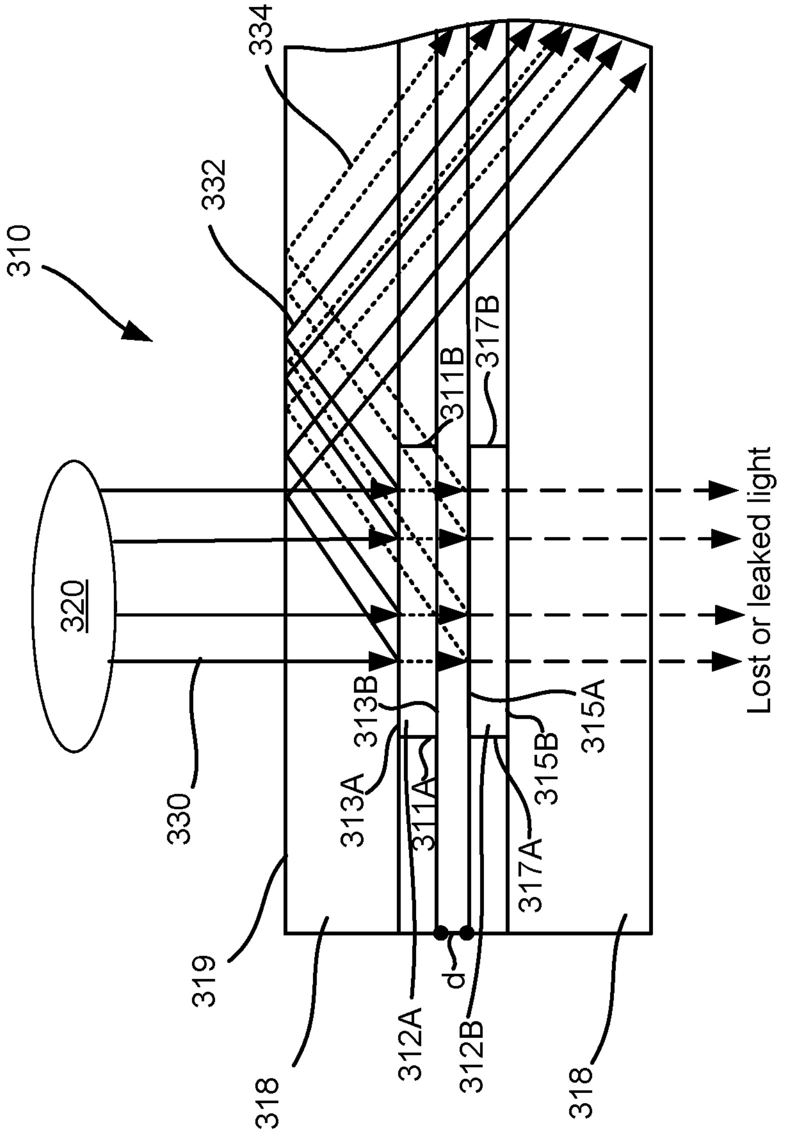
FIG. 3 illustrates a cross-section of an optical waveguide system in accordance with an embodiment of the disclosure.

FIG. 3 illustrates a cross-section of an optical waveguide system 310 in accordance with an embodiment of the disclosure. The optical waveguide system 310 is an example of the optical waveguide system 210 in FIG. 2. The optical waveguide system 310 includes an optical waveguide substrate 318, to which injection holographic layers 312A-312B are coupled. The optical waveguide substrate 318 may be formed by two separate pieces that are coupled to each other without a gap in between (e.g., two pieces of glass or plastic that are affixed to each other using optical epoxy (, or the optical waveguide substrate 318 may be a single piece (e.g., made by a single material without needing pieces to be affixed to each other). If the optical waveguide substrate 318 is separate pieces, each of the pieces may, but need not, be the same material (e.g., glass), thickness, etc. The pieces may have some or all of the same properties.

A light beam 330 is received at a surface 319 of the optical waveguide substrate 318. A light source 320 (e.g., a light engine) can project the light beam 330 towards the surface 319 along a light projection axis that intersects the surface 319 (e.g., the light beam 330 is normal—ninety degrees—to the surface 319, although other angles are possible). The light beam 330 propagates to a surface 313A of the injection holographic layer 312A, which is parallel to the surface 319. The injection holographic layer 312A also includes surface 313B that is opposite and parallel the surface 313A. The surface 313A receives the light beam 330 and injects a first portion 332 of the light beam 330 into the optical waveguide substrate 318 by diffracting the first portion 332 from the surface 313A at a diffraction angle relative to the surface 319 of the optical waveguide substrate 318. The first portion 332 represents a first image.

A remaining portion of the light beam 330 is output from the surface 313B and is received at a surface 315A of the injection holographic layer 312B that is parallel to the surface 313A and that is separated by a distance (d) from the surface 313B. The remaining portion of the light beam 330 may be received by the injection holographic layer 312B, whereby no total internal reflection occurs in the gap defined between the surface 313B and the surface 315A. The injection holographic layer 312B also includes surface 315B that is opposite and parallel the surface 315A. The injection holographic layer 312B injects a second portion 334 of the remaining portion of the light beam 330 into the optical waveguide substrate 318 by diffracting the second portion 334 from the surface 315A at the same diffraction angle relative to the surface 319. The second portion 334 represents a second image that is a duplicate of the first image. The first portion 332 and the second portion 334 can be extracted from the optical waveguide substrate 318 by an extraction holographic layer (e.g., the extraction holographic layer 116 in FIG. 1 or the extraction holographic layer 216 of FIG. 2). Any remaining portion of the light beam 330 that is not injected into the optical waveguide substrate 318 can be lost or leaked and is illustrated in FIG. 3 with dashed lines.

As illustrated in FIG. 3, the injection holographic layers 312A-312B may fully overlap. That is, each of the injection holographic layers 312A-312B may have edges that align with each other, where the alignment is along the light projection axis. In an example, injection holographic layer 312A includes edges 311A-311B that are parallel and opposite each other. Injection holographic layer 312B includes edges 317A-317B that are parallel and opposite each other. Edge 311A of the injection holographic layer 312A aligns with edge 317A of the injection holographic layer 312B and edge 311B of the injection holographic layer 312A aligns with edge 317B of the injection holographic layer 312B. Accordingly, the injection holographic layers 312A-312B are parallel to each other and fully overlap.

Figure 4:
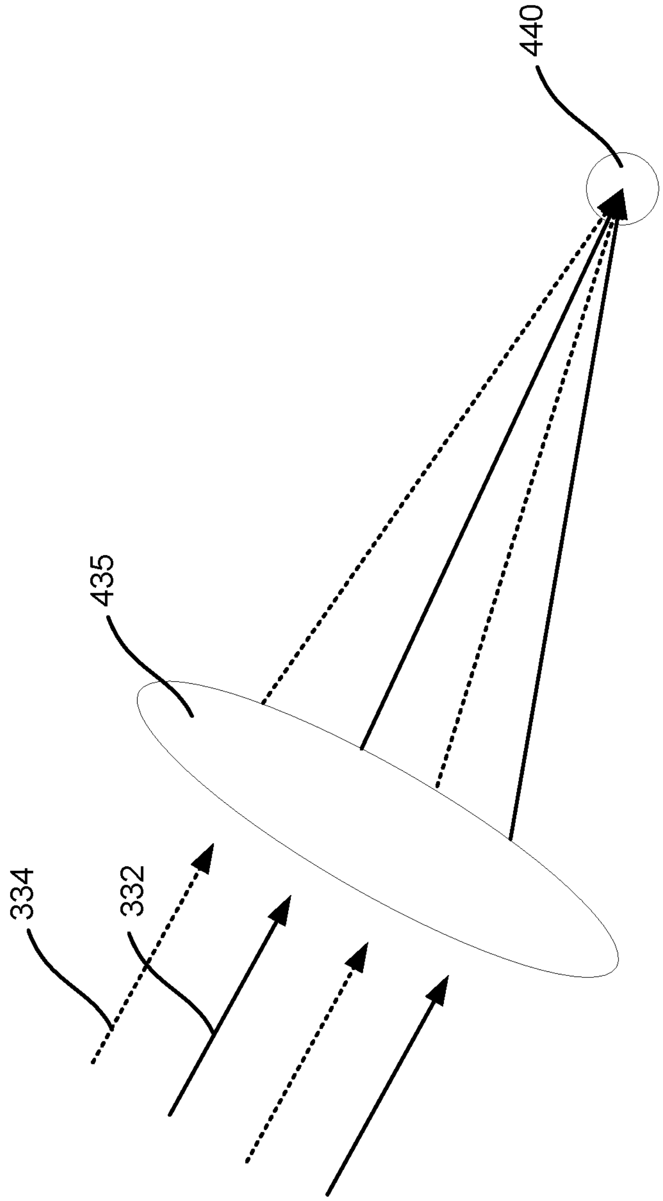
FIG. 4 illustrates diffracted light forming an image in accordance with an embodiment of the disclosure.

FIG. 4 illustrates diffracted light forming an image in accordance with an embodiment of the disclosure. Once extracted from an extraction holographic layer of the optical waveguide system 310 in FIG. 3, the first portion 332 of the light beam and the second portion 334 of the light beam can propagate towards a lens 435. Each of these two portions 332 and 334 include light rays that are collimated (e.g., parallel to each other) given that the same diffraction angle was used. The lens 435 can focus the first portion 332 and the second portion 334 at a focal point, which causes an image to be formed at the focal point 440. This image is a duplicate of the first image and the second image at the focal point 440. The focal point 440 can be a retina of a user, such that the user sees the image and it is brighter in luminosity than the first image and the second image individually.

Figure 5:
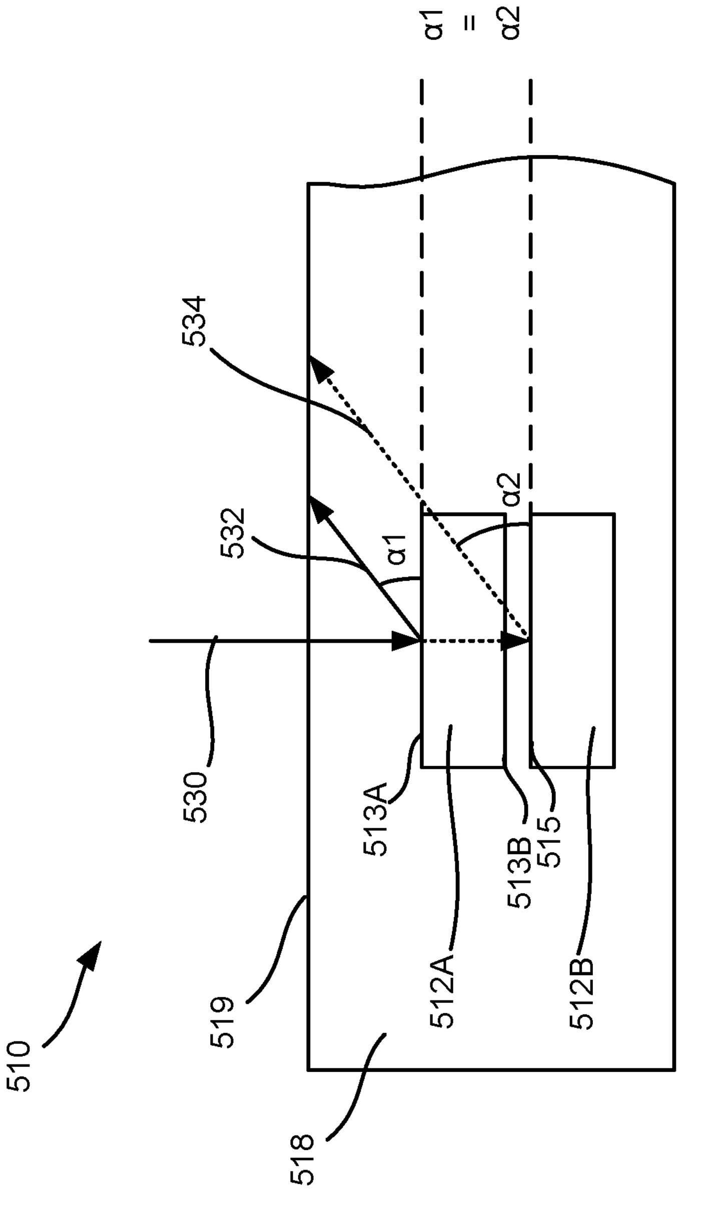
FIG. 5 illustrates an example of light diffraction by injection holographic layers of an optical waveguide system in accordance with an embodiment of the disclosure.

FIG. 5 illustrates an example of light diffraction by injection holographic layers of an optical waveguide system 510 in accordance with an embodiment of the disclosure. The optical waveguide system 510 is an example of the optical waveguide system 210 in FIG. 2. The optical waveguide system 510 includes an optical waveguide substrate 518, to which injection holographic layers 512A-512B are coupled.

A light beam 530 is received at a surface 519 of the optical waveguide substrate 518. The light beam 530 propagates to a surface 513 of the injection holographic layer 512A, which is parallel to the surface 519. The surface 513A receives the light beam 530 and injects a first portion 532 of the light beam 530 into the optical waveguide substrate 518 by diffracting the first portion 532 from the surface 513A at a diffraction angle ($\alpha$1) relative to the surface 519 of the optical waveguide substrate 518. In some instances, rather than the diffraction being by the surface 513A, the diffraction may be by the opposite surface 513B, and/or by any element or surface of the volume between the surfaces 513A-513B.

A remaining portion of the light beam 530 is not diffracted by and is output from the injection holographic layer 512A and is received at a surface 515 of the injection holographic layer 512B. The surface 515 is parallel to the surface 513 and is separated by a distance from the injection holographic layer 512A. The injection holographic layer 512B injects a second portion 534 of remaining portion of the light beam 530 into the optical waveguide substrate 518 by diffracting the second portion 534 from the surface 515. The second portion 534 is diffracted at a diffraction angle ($\alpha$2) relative to the surface 519 of the optical waveguide substrate 518. The diffraction angles $\alpha$1 and $\alpha$2 are equal, so that when the images formed by the first portion 532 and the second portion 534 are focused, a user sees a single image that is aberration free and that is brighter in luminosity than each of the individual images (e.g., a first image corresponding to the first portion 532 and a second image corresponding to the second portion 534).

The holograms, as used in the description provided herein and shown in the figures, can be reflection holograms.

However, other types of holograms are possible such as transmission holograms. In FIG. 5, the light is shown to be injected vertically down and bounce diagonally upwards to the right, indicating that it is a reflection hologram. In comparison, in the case of a transmission hologram, the light may be diffracted diagonally downwards to the right, indicating that the light is transmitted instead of being reflected.

Figure 6:
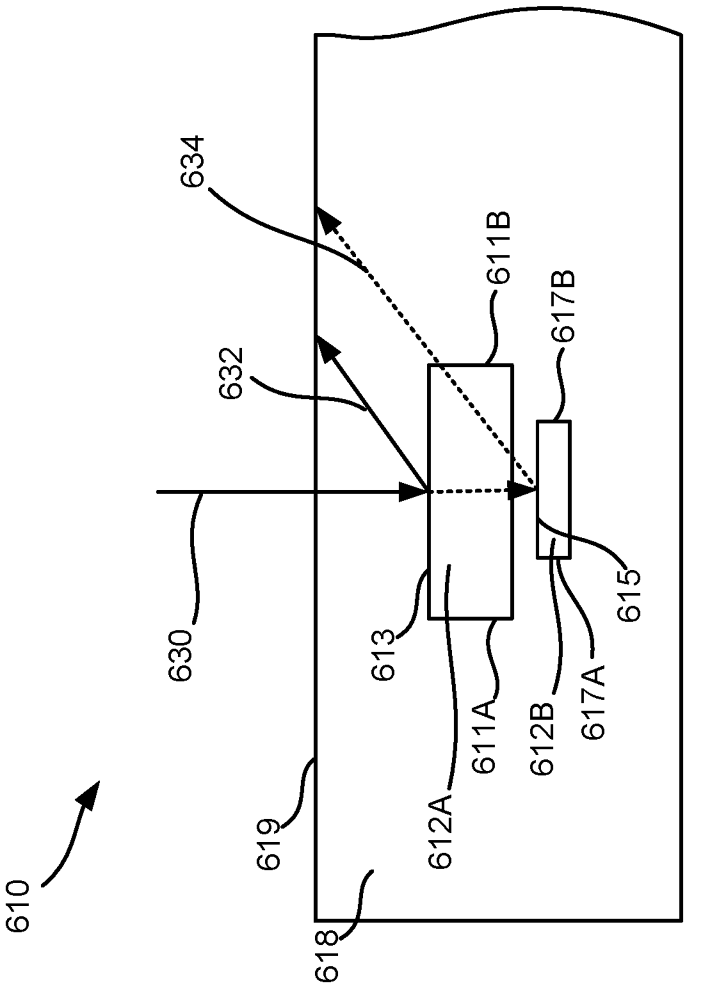
FIG. 6 illustrates an example of injection holographic layers of different sizes of an optical waveguide system in accordance with an embodiment of the disclosure.

FIG. 6 illustrates an example of injection holographic layers of different sizes of an optical waveguide system 610 in accordance with an embodiment of the disclosure. The optical waveguide system 610 is an example of the optical waveguide system 210 in FIG. 2. The optical waveguide system 610 includes an optical waveguide substrate 618, to which injection holographic layers 612A-612B are coupled.

A light beam 630 is received at a surface 619 of the optical waveguide substrate 618. The light beam 630 propagates to a surface 613 of the injection holographic layer 612A, which is parallel to the surface 619. The surface 613 receives the light beam 630 and injects a first portion 632 of the light beam 630 into the optical waveguide substrate 618 by diffracting the first portion 632 from the surface 613 at a diffraction angle relative to the surface 619 of the optical waveguide substrate 618.

A remaining portion of the light beam 630 is output from the injection holographic layer 612A and is received at a surface 615 of the injection holographic layer 612B. The surface 615 is parallel to the surface 613 and is separated by a distance from the injection holographic layer 612A. The injection holographic layer 612B injects a second portion 634 of the light beam 630 into the optical waveguide substrate 618 by diffracting the second portion 634 from the surface 615. The second portion 634 is diffracted at the same diffraction angle relative to the surface 619 of the optical waveguide substrate 618.

As illustrated in FIG. 6, the injection holographic layers 612A-612B may only partially overlap. That is, each of the injection holographic layers 612A-612B may have one or more edges that do not align with each other. In an example, injection holographic layer 612A includes edges 611A-611B that are parallel and opposite each other. Injection holographic layer 612B includes edges 617A-617B that are parallel and opposite each other. Edges 617A-617B of the injection holographic layer 612B are between edges 611A-611B of the injection holographic layer 612A, meaning that the injection holographic layer 612A is wider than the injection holographic layer 612B. If the light beam 630 were to be injected into the optical waveguide substrate 618 between edge 611A and 617A or between edge 611B and 617B, the remaining light that is output by the injection holographic layer 612A would not be received and diffracted by the injection holographic layer 612B.

In addition, a length of the edges 611A-611B may be longer than a length of the edges 617A-617B, meaning that the injection holographic layer 612A is thicker than the injection holographic layer 612B. The injection holographic layers 612A-612B may optionally also differ in optical absorption, diffraction efficiency, diffraction index, diffraction grating, or grating pitch.

Figure 7:
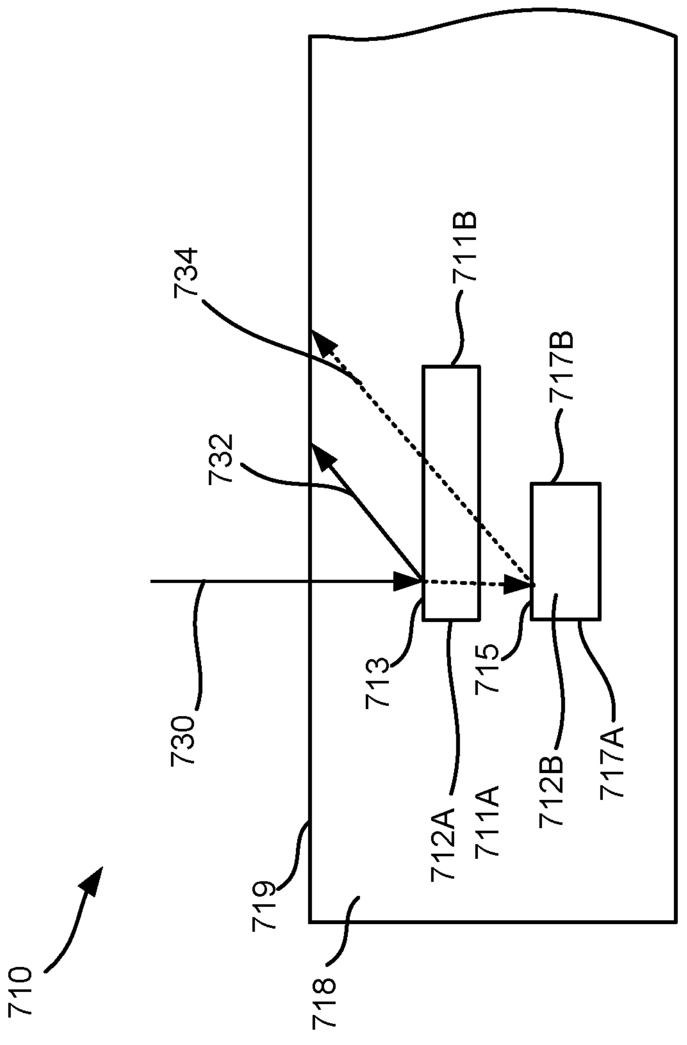
FIG. 7 illustrates another example of injection holographic layers of different sizes of an optical waveguide system in accordance with an embodiment of the disclosure.

FIG. 7 illustrates another example of injection holographic layers of different sizes of an optical waveguide system 710 in accordance with an embodiment of the disclosure. The optical waveguide system 710 is an example of the optical waveguide system 210 in FIG. 2. The optical waveguide system 710 includes an optical waveguide substrate 718, to which injection holographic layers 712A-712B are coupled.

A light beam 730 is received at a surface 719 of the optical waveguide substrate 718. The light beam 730 propagates to a surface 713 of the injection holographic layer 712A, which is parallel to the surface 719. The surface 713 receives the light beam 730 and injects a first portion 732 of the light beam 730 into the optical waveguide substrate 718 by diffracting the first portion 732 from the surface 713 at a diffraction angle relative to the surface 719 of the optical waveguide substrate 718.

A remaining portion of the light beam 730 is output from the injection holographic layer 712A and is received at a surface 715 of the injection holographic layer 712B. The surface 715 is parallel to the surface 713 and is separated by a distance from the injection holographic layer 712A. The injection holographic layer 712B injects a second portion 734 of the light beam 730 into the optical waveguide substrate 718 by diffracting the second portion 734 from the surface 715. The second portion 734 is diffracted at the same diffraction angle relative to the surface 719 of the optical waveguide substrate 718.

As illustrated in FIG. 7, the injection holographic layers 712A-712B may only partially overlap. That is, each of the injection holographic layers 712A-712B may have one or more edges that do not align with each other. In an example, injection holographic layer 712A includes edges 711A-711B that are parallel and opposite each other. Injection holographic layer 712B includes edges 717A-717B that are parallel and opposite each other. Edges 711A of the injection holographic layer 712A aligns with edge 717A of the injection holographic layer 712B, but edge 711B of the injection holographic layer 712A does not align with edge 717B of the injection holographic layer 712B. In FIG. 7, the injection holographic layer 712A is wider than the injection holographic layer 712B. If the light beam 730 were to be injected into the optical waveguide substrate 718 between edge 717B and edge 711B, the remaining light that is output by the injection holographic layer 712A would not be received and diffracted by the injection holographic layer 712B.

In addition, a length of the edges 711A-711B is shorter than a length of the edges 717A-717B, meaning that the injection holographic layer 712A is thinner than the injection holographic layer 712B. The injection holographic layers 712A-712B may optionally also differ in optical absorption, diffraction efficiency, diffraction index, diffraction grating, or grating pitch.

Figure 8:
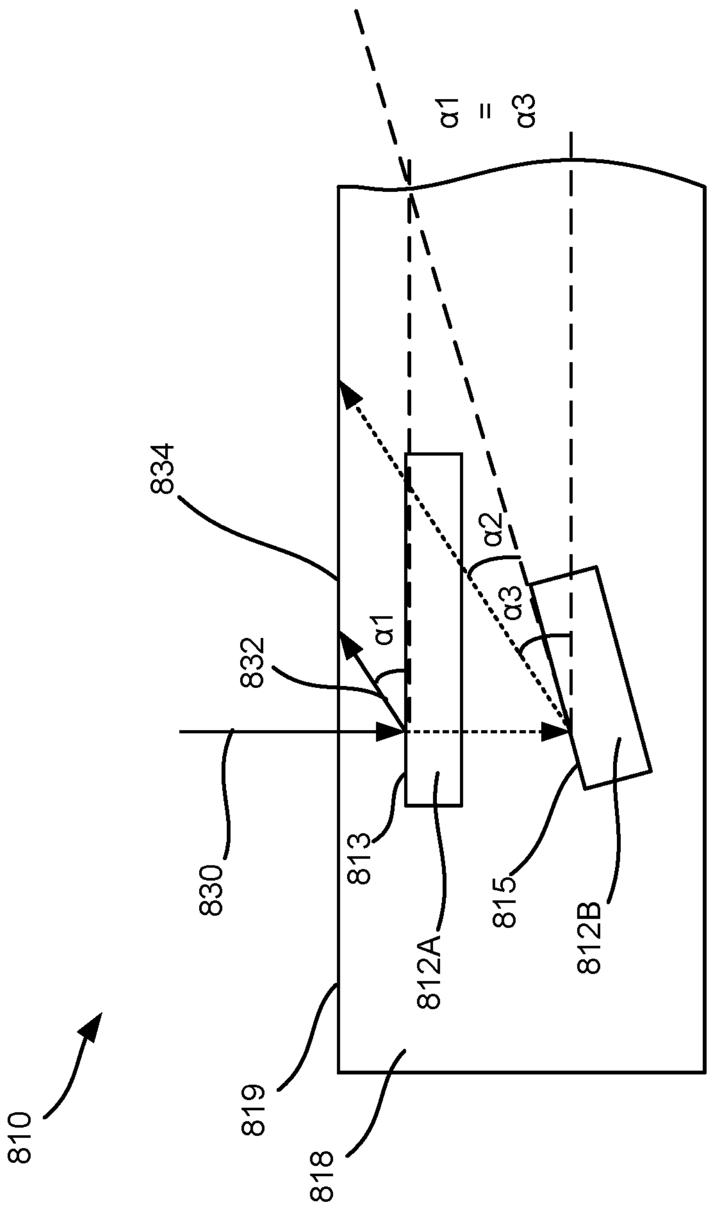
FIG. 8 illustrates an example of light diffraction by angled injection holographic layers of an optical waveguide system in accordance with an embodiment of the disclosure.

FIG. 8 illustrates an example of light diffraction by angled injection holographic layers of an optical waveguide system 810 in accordance with an embodiment of the disclosure. The optical waveguide system 810 is an example of the optical waveguide system 210 in FIG. 2. The optical waveguide system 810 includes an optical waveguide substrate 818, to which injection holographic layers 812A-812B are coupled.

A light beam 830 is received at a surface 819 of the optical waveguide substrate 818. The light beam 830 propagates to a surface 813 of the injection holographic layer 812A, which is parallel to the surface 819. The surface 813 receives the light beam 830 and injects a first portion 832 of the light beam 830 into the optical waveguide substrate 818 by diffracting the first portion 832 from the surface 813 at a diffraction angle ($\alpha 1$) relative to the surface 819 of the optical waveguide substrate 818.

A remaining portion of the light beam 830 is output from the injection holographic layer 812A and is received at a surface 815 of the injection holographic layer 812B. The injection holographic layer 812B is angled relative to the injection holographic layer 812A, so the surface 815 is angled relative to the surface 813 and is separated by a distance from the injection holographic layer 812A. The injection holographic layer 812B injects a second portion 834 of the light beam 830 into the optical waveguide substrate 818 by diffracting the second portion 834 from the surface 815. The second portion 834 is diffracted at a diffraction angle (α2) relative to the surface 815 of the injection holographic layer 812B. However, relative to the surface 819 of the optical waveguide substrate 818, the second portion 834 is diffracted at a diffraction angle (α3) that is equal to the diffraction angle (α1). As such, when the images formed by the first portion 832 and the second portion 834 are focused, a user sees a single, brighter, aberration-free image.

Figure 9:
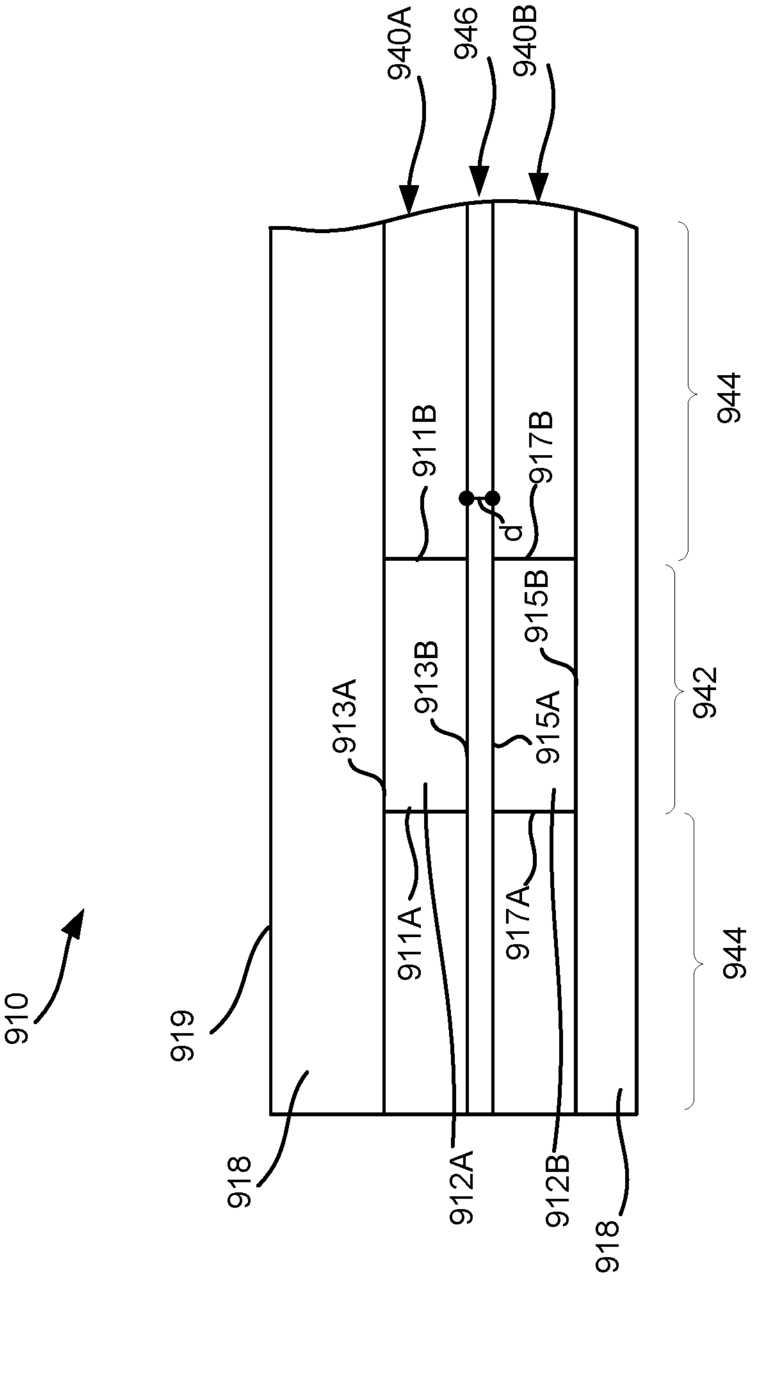
FIG. 9 illustrates an example of an optical waveguide system including photopolymer films in accordance with an embodiment of the disclosure.

FIG. 9 illustrates an example of an optical waveguide system 910 including photopolymer films in accordance with an embodiment of the disclosure. The optical waveguide system 910 is an example of the optical waveguide system 210 in FIG. 2. The optical waveguide system 910 includes an optical waveguide substrate 918, to which injection holographic layers 912A-912B are coupled. The optical waveguide substrate 918 may be two separate pieces, or the optical waveguide substrate 918 may be a single piece.

In an example, the injection holographic layers 912A-912B are formed in photopolymer films 940A-940B that are disposed on or in the optical waveguide substrate 918. Different techniques are possible to form a holographic layer in a photopolymer film, such as recording the holographic layer as a volume holographic optical element (VHOE) or etching the holographic layer a surface relief grating (SRG). As illustrated, the injection holographic layer 912A is formed in the photopolymer film 940A and the injection holographic layer 912B is formed in the photopolymer film 940B. The photopolymer film 940B is separated by a distance (d) from the photopolymer film 940A. In an example, the photopolymer films 940A-940B may be made of Covestro Bayfold®, which has a sensitivity of ten mJ per $cm^2$ and is easy to post process by simple ultraviolet light (e.g., sun or lamp) exposure. Dichromated gelatin (DCG) is another material that can achieve a high index modulation and is robust to the environment once encapsulated.

Each of the photopolymer films 940A-940B may include a first section 942 and a second section 944. The injection holographic layer 912A can be formed in the first section 942 of the photopolymer film 940A and the injection holographic layer 912B can be formed in the first section 942 of the photopolymer film 940B. The second section 944 of the photopolymer films 940A-940B does not include injection holographic layers. As such, the first section includes the injection holographic layer 912A and has a first diffraction grating. In comparison, the second section can exclude any injection holographic layer and can have a second diffracting grating different than the first diffraction grating such that the light passes through the second section without diffraction. A redirection holographic layer or an extraction holographic layer may, but need not, be formed in the second section 944 of the photopolymer films 940A-940B.

Similar to FIG. 3, a light beam can be received at a surface 919 of the optical waveguide substrate 918. The light beam can propagate to a surface 913A of the injection holographic layer 912A, which is parallel to the surface 919. The injection holographic layer 912A also includes surface 913B that is opposite and parallel the surface 913A. The surface 913A can receive the light beam and inject a first portion of the light beam into the optical waveguide substrate 918 by diffracting the first portion from the surface 913A at a diffraction angle relative to the surface 919 of the optical waveguide substrate 918.

A remaining portion of the light beam is output from the surface 913B and is received at a surface 915A of the injection holographic layer 912B that is parallel to the surface 913A and that is separated by the distance (d) from the surface 913B. The injection holographic layer 912B also includes surface 915B that is opposite and parallel the surface 915A. The injection holographic layer 912B injects a second portion of the light beam into the optical waveguide substrate 918 by diffracting the second portion from the surface 915A. The first portion and the second portion can be extracted from the optical waveguide substrate by an extraction holographic layer (e.g., extraction holographic layer 116 in FIG. 1).

As illustrated in FIG. 9, the injection holographic layers 912A-912B may fully overlap. That is, each of the injection holographic layers 912A-912B may have edges that align with each other. In an example, injection holographic layer 912A includes edges 911A-911B that are parallel and opposite each other. Injection holographic layer 912B includes edges 917A-917B that are parallel and opposite each other. Edge 911A of the injection holographic layer 912A aligns with edge 917A of the injection holographic layer 912B and edge 911B of the injection holographic layer 912A aligns with edge 917B of the injection holographic layer 912B. Accordingly, the injection holographic layers 912A-912B are parallel to each other and fully overlap.

In an example, the optical waveguide system 910 also includes an adhesive layer 946 disposed between the photopolymer films 940A-940B. The adhesive layer 946 (e.g., optical epoxy) can have a refractive index that is similar to the refractive index of the injection holographic layer 912A, such that no total internal reflection occurs between the photopolymer films 940A-940B.

Figure 10:
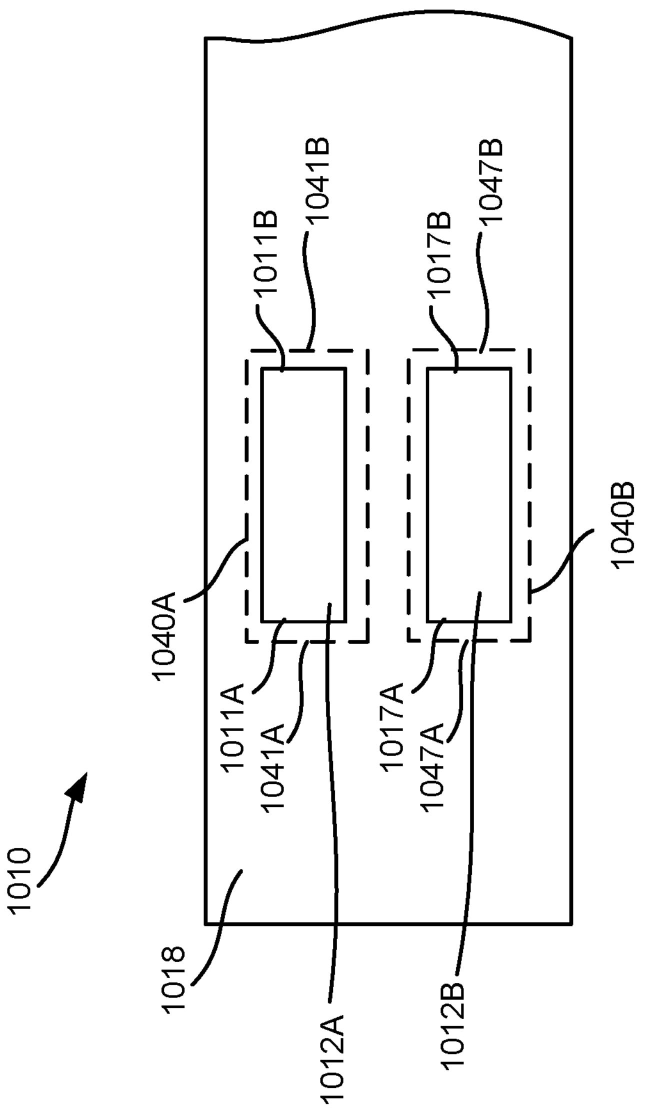
FIG. 10 illustrates another example of an optical waveguide system including photopolymer films in accordance with an embodiment of the disclosure.

FIG. 10 illustrates another example of an optical waveguide system 1010 including photopolymer films in accordance with an embodiment of the disclosure. The optical waveguide system 1010 is an example of the optical waveguide system 210 in FIG. 2. The optical waveguide system 1010 includes an optical waveguide substrate 1018, to which injection holographic layers 1012A-1012B are coupled. The injection holographic layers 1012A-1012B can be formed in photopolymer films 1040A-1040B that are disposed on or in the optical waveguide substrate 1018. As illustrated, the injection holographic layer 1012A is formed in the photopolymer film 1040A and the injection holographic layer 1012B is formed in the photopolymer film 1040B. The photopolymer film 1040B is separated by a distance from the photopolymer film 1040A.

In an example, rather than extending along a length of the optical waveguide substrate 1018, the photopolymer films 1040A-1040B may only encapsulate the injection holographic layers 1012A-1012B and may not extend beyond edges of the injection holographic layers 1012A-1012B. For clarity, the photopolymer films 1040A-1040B are shown as dashed lines that surround the injection holographic layers 1012A-1012B, but it should be understood that the edges of the photopolymer films 1040A-1040B can line up with the edges of the injection holographic layers 1012A-1012B. For instance, injection holographic layer 1012A includes edges 1011A-1011B that are parallel and opposite each other. Injection holographic layer 1012B includes edges 1017A-1017B that are parallel and opposite each other. In addition, photopolymer film 1040A includes edges 1041A-1041B that are parallel and opposite each other, and photopolymer film 1040B includes edges 1047A-1047B that are parallel and opposite each other. Edge 1011A of the injection holographic layer 1012A aligns with edge 1041A of the photopolymer film 1040A and edge 1011B of the injection holographic layer 1012A aligns with edge 1041B of the photopolymer film 1040A. Additionally, edge 1017A of the injection holographic layer 1012B aligns with edge 1047A of the photopolymer film 1040B and edge 1017B of the injection holographic layer 1012B aligns with edge 1047B of the photopolymer film 1040B. Accordingly, the photopolymer films 1040A-1040B end at the edges of the injection holographic layers 1012A-1012B.

Any combination of arrangements shown in FIGS. 9-10 and/or other figures can be used. For instance, the optical waveguide system may have a photopolymer film that extends along a length of the optical waveguide substrate for a first injection holographic layer as shown in FIG. 9, whereas the second holographic layer is just contained in a small photopolymer film that does not extend along the length, as shown in FIG. 10.

Figure 11:
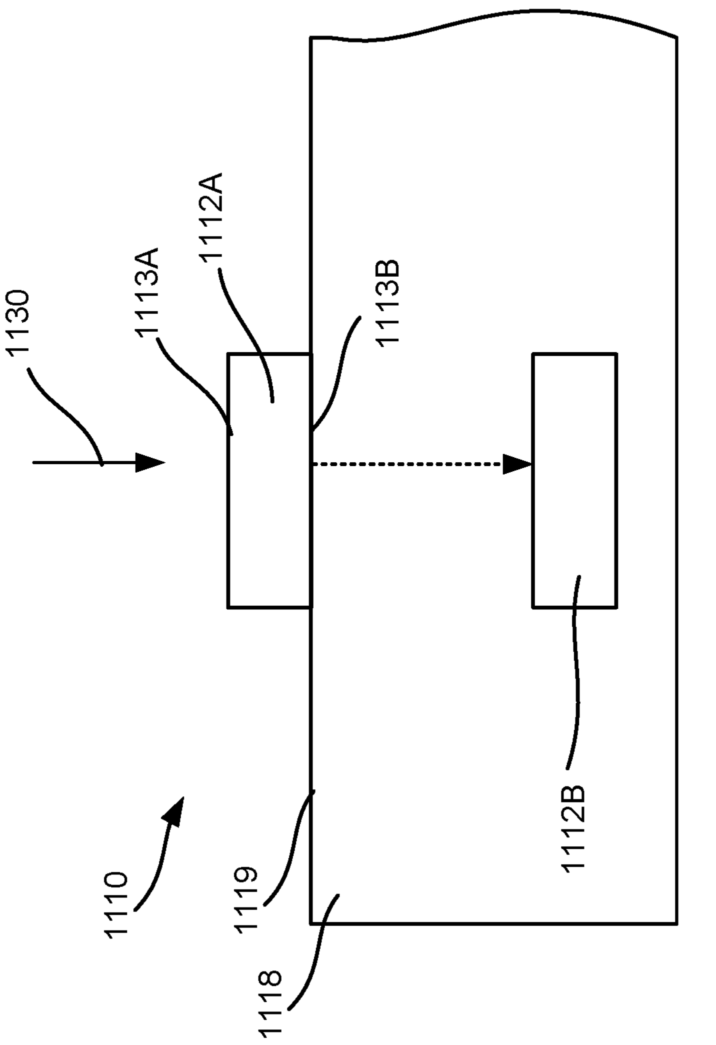
FIG. 11 illustrates an example of an injection holographic layer disposed on a surface of an optical waveguide substrate in accordance with an embodiment of the disclosure.

FIG. 11 illustrates an example of an injection holographic layer 1112A disposed on a surface 1119 of an optical waveguide substrate 1118 in accordance with an embodiment of the disclosure. The injection holographic layer 1112A and the optical waveguide substrate 1118 can be part of an optical waveguide system 1110, which is an example of the optical waveguide system 210 in FIG. 2. The optical waveguide system 1110 can also include an injection holographic layer 1112B coupled to the optical waveguide substrate 1118 (e.g., formed inside the optical waveguide substrate 1118).

The injection holographic layer 1112A includes surfaces 1113A-1113B, which are parallel and opposite each other. Surface 1113B of the injection holographic layer 1112A aligns with the surface 1119 of the optical waveguide substrate 1118. A light beam 1130 is received at the surface 1113A, which injects a first portion of the light beam 1130 into the optical waveguide substrate 1118 by diffracting the first portion from the surface 1113A at a diffraction angle relative to the surface 1119 of the optical waveguide substrate 1118. A remaining portion of the light beam 1130 is output from the surface 1113B of the injection holographic layer 1112A and is received at the injection holographic layer 1112B, which injects a second portion of the light beam 1130 into the optical waveguide substrate 1118.

Figure 12:
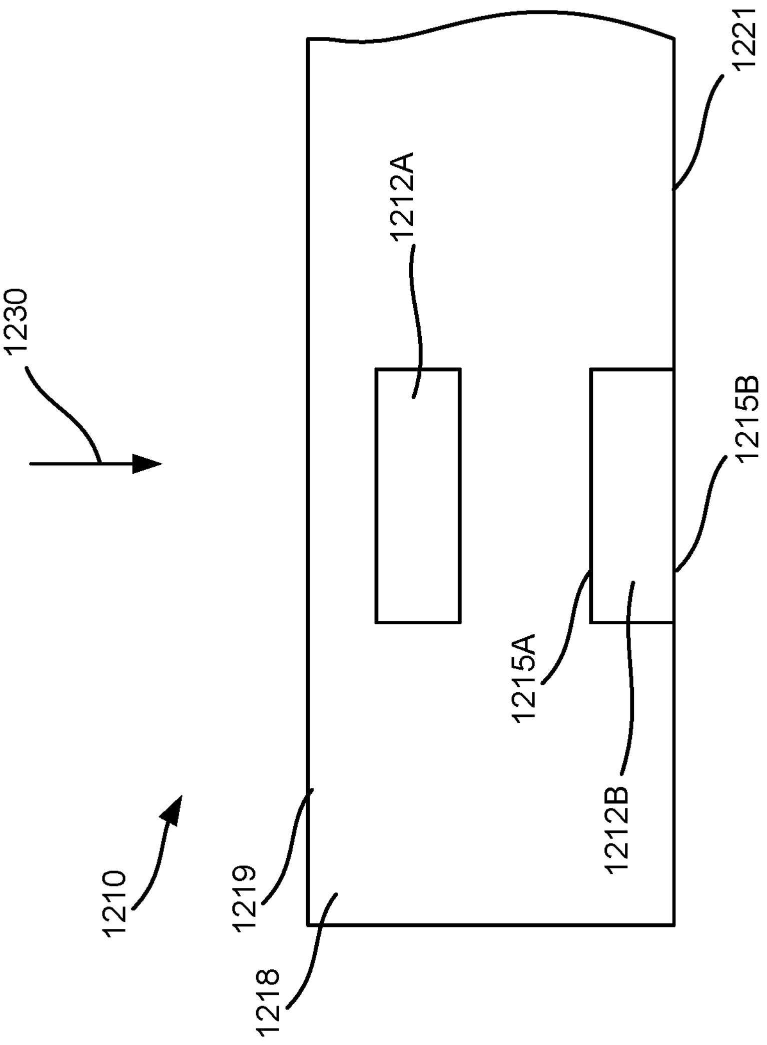
FIG. 12 illustrates another example of an injection holographic layer disposed on a surface of an optical waveguide substrate in accordance with an embodiment of the disclosure.

FIG. 12 illustrates another example of an injection holographic layer 1212B disposed on a surface 1221 of an optical waveguide substrate 1218 in accordance with an embodiment of the disclosure. The injection holographic layer 1212B and the optical waveguide substrate 1218 can be part of an optical waveguide system 1210, which is an example of the optical waveguide system 210 in FIG. 2. The optical waveguide system 1210 can also include an injection holographic layer 1212A coupled to the optical waveguide substrate 1218. Both injection holographic layers 1212A and 1212B are formed inside the optical waveguide system 1210. In the illustration of FIG. 12, the injection holographic layer 1212B is formed at bottom surface of the optical waveguide substrate 1218.

A light beam 1230 is received at a surface 1219 of the optical waveguide substrate and propagates the light beam 1230 to the injection holographic layer 1212A. The injection holographic layer 1212A injects a first portion of the light beam 1230 into the optical waveguide substrate 1218 by diffracting the first portion at a diffraction angle relative to the surface 1219 of the optical waveguide substrate 1218. A remaining portion of the light beam 1230 is output from the injection holographic layer 1212A and is received at the injection holographic layer 1212B. The injection holographic layer 1212B includes surfaces 1215A-1215B, which are parallel and opposite each other. Surface 1215B of the injection holographic layer 1212B aligns with the surface 1221 of the optical waveguide substrate 1218. The surface 1215A of the injection holographic layer 1212B injects a second portion of the light beam 1230 into the optical waveguide substrate 1218.

Figure 13:
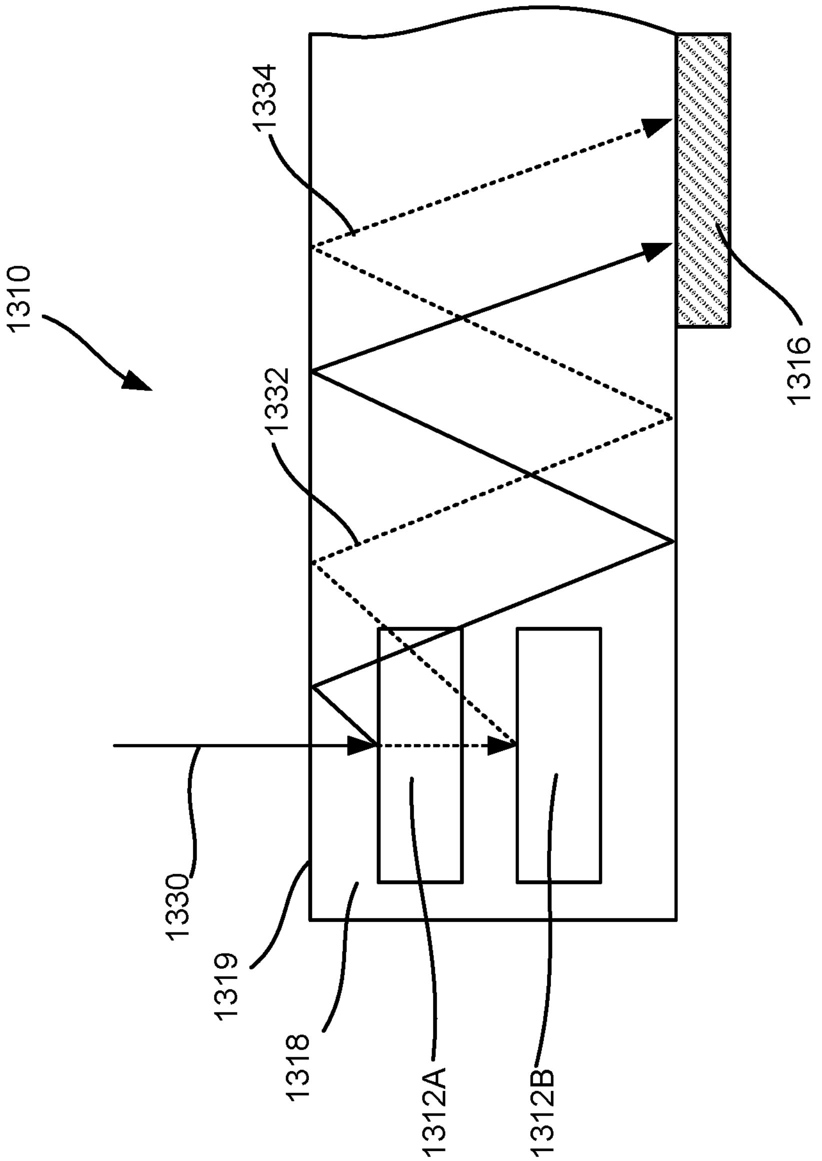
FIG. 13 illustrates an example of an optical waveguide system in accordance with an embodiment of the disclosure.

FIG. 13 illustrates an example of an optical waveguide system 1310 in accordance with an embodiment of the disclosure. The optical waveguide system 1310 is an example of the optical waveguide system 210 in FIG. 2. The optical waveguide system 1310 includes an optical waveguide substrate 1318, to which injection holographic layers 1312A-1312B are coupled. Although a stack of parallel and fully overlapping injection holographic layers is shown, other stack arrangements are possible such as any of the stack arrangements shown in the above figures.

A light beam 1330 is received at a surface 1319 of the optical waveguide substrate 1318. The light beam 1330 propagates to a surface 1313 of the injection holographic layer 1312A, which is parallel to the surface 1319. The surface receives the light beam 1330 and injects a first portion 1332 of the light beam 1330 into the optical waveguide substrate 1318 by diffracting the first portion 1332 from the surface at a diffraction angle relative to the surface 1319 of the optical waveguide substrate 1318. The first portion 1332 represents a first image.

A remaining portion of the light beam 1330 is output from the injection holographic layer 1312B and is received at a surface of the injection holographic layer 1312B that is separated by a distance from the injection holographic layer 1312A. The injection holographic layer 1312B injects a second portion 1334 of the light beam 1330 into the optical waveguide substrate 1318 by diffracting the second portion 1334 at the same diffraction angle (e.g., relative to the surface 1319). The second portion 1334 represents a second image that is a duplicate of the first image. The first portion 1332 and the second portion 1334 can propagate through the optical waveguide substrate 1318 by total internal reflection until being received by an extraction holographic layer 1316, which can extract the first portion 1332 and the second portion 1334 as an output light beam that represents an image that is an aberration-free duplicate of the first image and that is brighter in luminosity than the first image or the second image individually.

Figure 14:
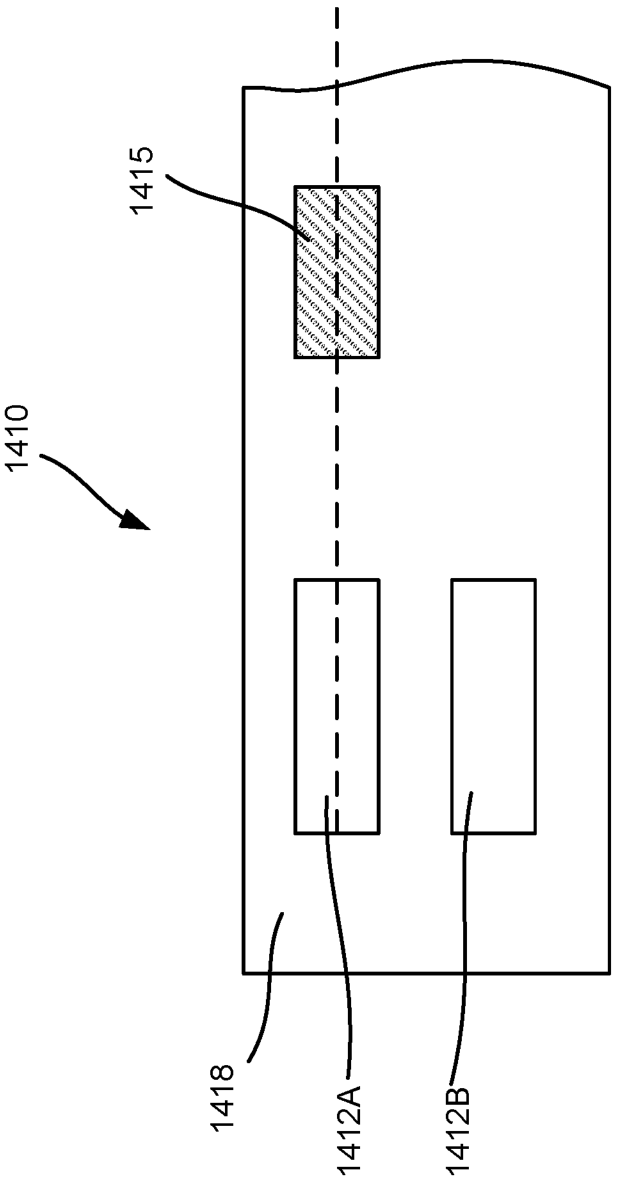
FIG. 14 illustrates an example of an optical waveguide system including injection holographic layers and another holographic layer in accordance with an embodiment of the disclosure.

FIG. 14 illustrates an example of an optical waveguide system 1410 including injection holographic layers 1412A-1412B and another holographic layer in accordance with an embodiment of the disclosure. The optical waveguide system 1410 is an example of the optical waveguide system 210 in FIG. 2. The optical waveguide system 1410 includes an optical waveguide substrate 1418, to which the injection holographic layers 1412A-1412B are coupled. Although a stack of parallel and fully overlapping injection holographic layers is shown, other stack arrangements are possible such as any of the stack arrangements shown in the above figures.

A holographic layer 1415 is also coupled to the optical waveguide substrate 1418. The holographic layer 1415 may be a redirection holographic layer (e.g., redirection holographic layer 114 in FIG. 1) or an extraction holographic layer (e.g., extraction holographic layer 116 in FIG. 1). The holographic layer 1415 is disposed along a same axis, illustrated by the dashed line, as the injection holographic layer 1412A.

In an example, the injection holographic layers 1412A-1412B may be formed in photopolymer films (e.g., photopolymer films 940A-940B in FIG. 9) that are disposed on or in the optical waveguide substrate 1418. In addition, the holographic layer 1415 may be formed in a photopolymer film. For instance, both the injection holographic layer 1412A and the holographic layer 1415 may be formed in the same photopolymer film.

Figure 15:
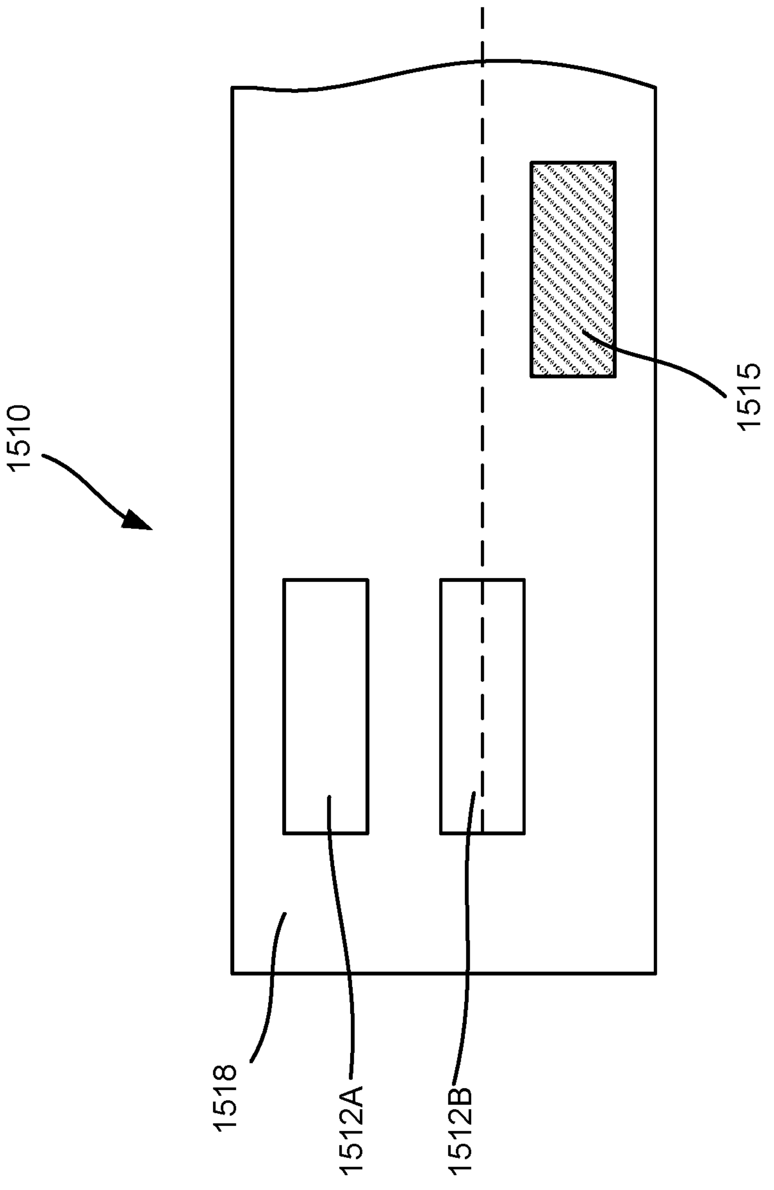
FIG. 15 illustrates another example of an optical waveguide system including injection holographic layers and another holographic layer in accordance with an embodiment of the disclosure.

FIG. 15 illustrates another example of an optical waveguide system 1510 including injection holographic layers 1512A-1512B and another holographic layer in accordance with an embodiment of the disclosure. The optical waveguide system 1510 is an example of the optical waveguide system 210 in FIG. 2. The optical waveguide system 1510 includes an optical waveguide substrate 1518, to which the injection holographic layers 1512A-1512B are coupled. Although a stack of parallel and fully overlapping injection holographic layers is shown, other stack arrangements are possible such as any of the stack arrangements shown in the above figures.

A holographic layer 1515 is also coupled to the optical waveguide substrate 1518. The holographic layer 1515 may be a redirection holographic layer (e.g., redirection holographic layer 114 in FIG. 1) or an extraction holographic layer (e.g., extraction holographic layer 116 in FIG. 1). The holographic layer 1515 is not disposed along a same axis as either of the injection holographic layers 1512A-1512B. Instead, the holographic layer 1515 is offset (e.g., in the vertical direction shown in FIG. 15) relative to the injection holographic layers 1512A and 1512B.

Figure 16:
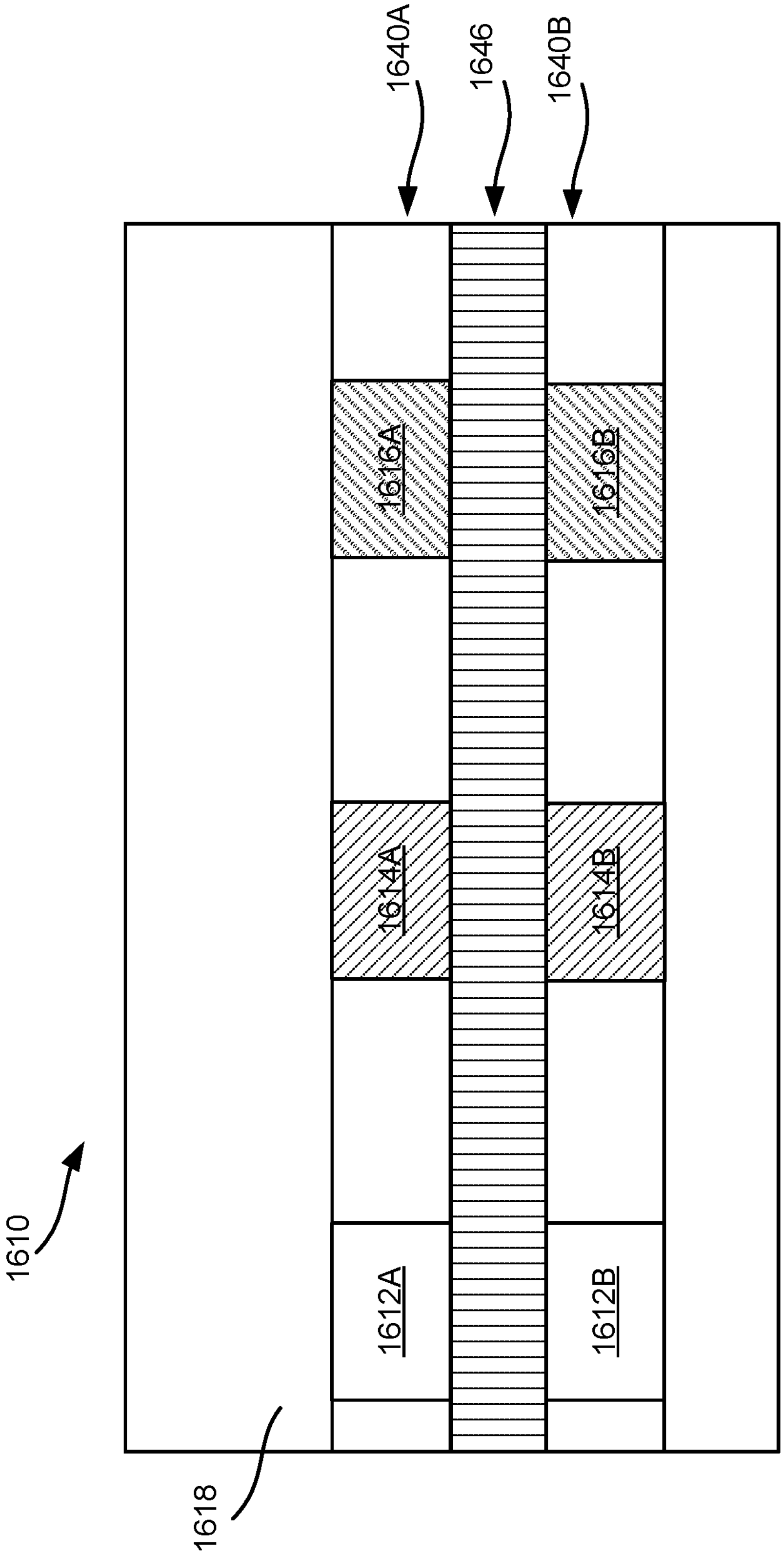
FIG. 16 illustrates an example of holographic layers in an optical waveguide system including photopolymer films in accordance with an embodiment of the disclosure.

FIG. 16 illustrates an example of holographic layers in an optical waveguide system 1610 including photopolymer films in accordance with an embodiment of the disclosure. The optical waveguide system 1610 is an example of the optical waveguide system 210 in FIG. 2. The optical waveguide system 1610 includes an optical waveguide substrate 1618, with photopolymer films 1640A-1640B disposed on or in the optical waveguide substrate 1618.

In an example, injection holographic layers 1612A-1612B, redirection holographic layers 1614A-1614B, and extraction holographic layers 1616A-1616B are formed in the photopolymer films 1640A-1640B. As illustrated, the injection holographic layer 1612A, the redirection holographic layer 1614A, and the extraction holographic layer 1616A are formed in the photopolymer film 1640A, and the injection holographic layer 1612B, the redirection holographic layer 1614B, and the extraction holographic layer 1616B are formed in the photopolymer film 164040B. The photopolymer film 1640B is separated by a distance from the photopolymer film 1640A. There may be an intermediate layer 1646 between the photopolymer films 1640A-1640B, such as an adhesive layer, that has a refractive index similar to the refractive index of the injection holographic layer 1612A, the redirection holographic layer 1614A, and the extraction holographic layer 1616A so that no total internal reflection light occurs between the photopolymer films 1640A-1640B.

The injection holographic layers 1612A-1612B form a first stack of holographic layers configured to inject light into the optical waveguide substrate 1619. The redirection holographic layers 1614A-1614B form a second stack of holographic layers configured to redirect injected light in the optical waveguide substrate 1619. The extraction holographic layers 1614A-1614B form a third stack of holographic layers configured to extract redirected light from the optical waveguide substrate 1619. In each of the three stacks, the same diffraction angle (e.g., relative to a surface of the optical waveguide substrate 1619) is achieved by each holographic layer of the stack. The diffraction angles of the stacks may be different from each other.

Referring back to FIGS. 9-16, a holographic optical layer can be coupled to optical waveguide substrate using different mechanisms. For example, and as shown in these figures, the holographic optical layer can be embedded in the optical waveguide substrate or attached to a surface of the optical waveguide substrate.

Figure 17:
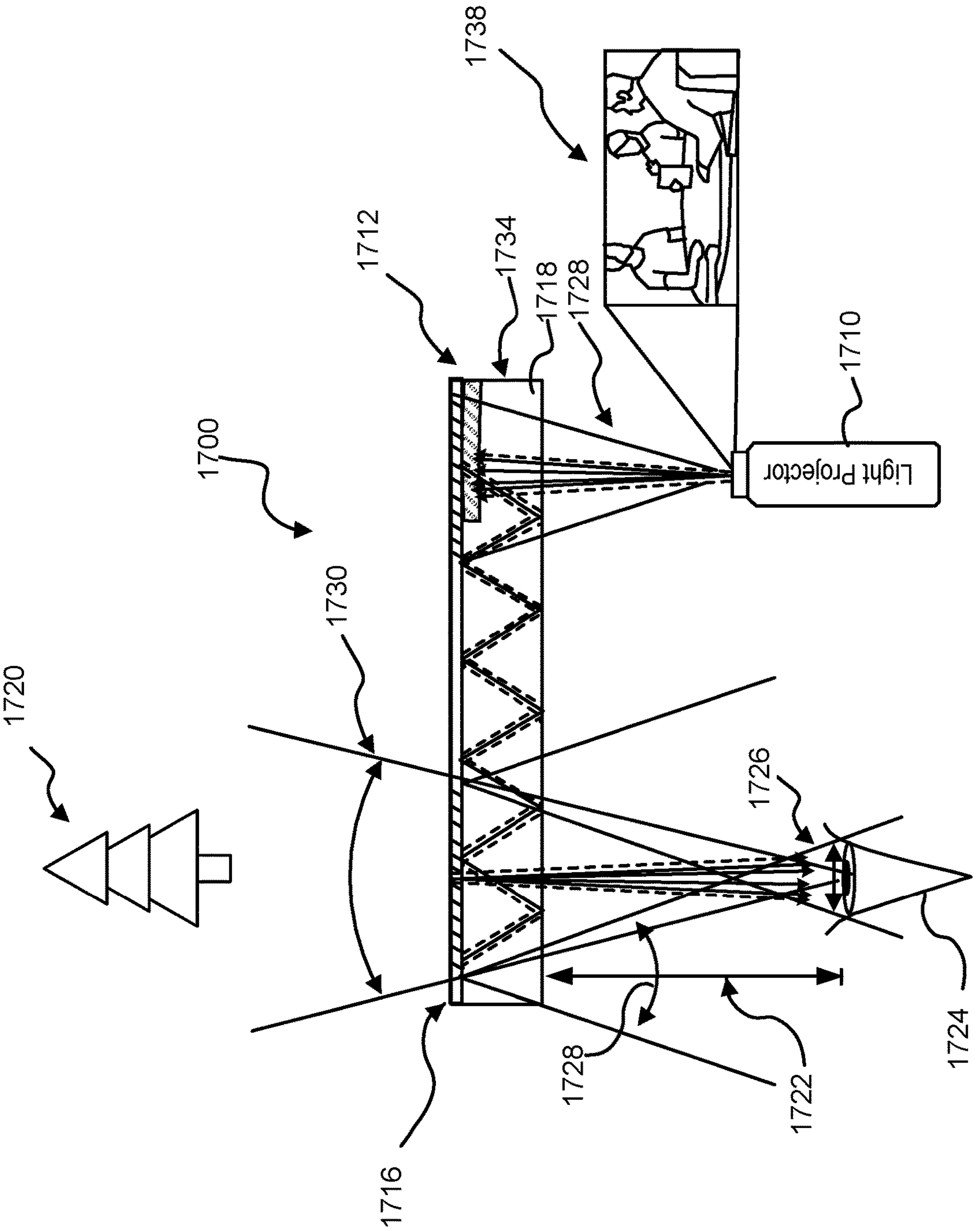
FIG. 17 illustrates a schematic of a system of a waveguide combiner in accordance with an embodiment of the present disclosure.

FIG. 17 illustrates a schematic of a system of an optical lens set and image combiner in accordance with an embodiment of the present disclosure. An optical system 1700 can be used in mixed reality display, such as a heads-up display or an augmented reality display. The optical system 1700 includes an optical combiner 1734. Pupil replication decouples the pupil size from the field of view, which are otherwise inversely linked in other types of mixed reality systems. This advantage means that the optical combiner based displays can offer a large eye box together with a large image field of view. In an example, the optical combiner 1734 may be a waveguide optical combiner. Nonetheless, other optical combiner types are possible, such as a holographic optical element-based combiner, or any other suitable optical combiner, in other examples.

Pupil replication in the optical combiner 1734 can be obtained when the image that is propagating inside the optical combiner 1734 is only partially extracted (or redirected) the optical combiner 1734. When this happens, the remainder of the light keeps propagating in its original direction inside the optical combiner 1734. The remaining light bounces on the outer surface of the optical combiner 1734 and then interacts again with the holographic optical element, where another portion is extracted (or redirected). Successive extractions of the light replicate the pupil multiple times.

The optical combiner 1734 can be built using waveguide holography. This technique uses an injection hologram 1712 having at least two injection holographic layers arranged in a stack to trap auxiliary content 1738 (e.g., projector-emitted light representing virtual images) inside a substrate 1718 through TIR. The auxiliary content 1738 can be generated by a light projector 1710 (e.g., a light engine configured as a light source). In the substrate 1718, the auxiliary content 1738 propagates away from the light projector 1710 and is outcoupled toward a viewer's eye 1724 by an extraction hologram 1716. A hologram represents a functional diffractive structure that transforms the waveform of the input beam into an output beam. A volume holographic element (VHOE) is a type of hologram that operates in the Bragg diffraction regime. The optical combiner 1734 represents the optical elements in the optical path from the exit aperture of the light projector 1710 to the plane where light enters the viewer's eye 1724. Both the injection hologram 1712 and the extraction hologram 1716 are transparent across the entire or a predefined visible range except for a percent reduction (depending on different parameters such as the type materials used, thickness, etc.) in transmission across the bandwidth of the broadband red-green-blue (RGB) light sources. This allows the viewer to see real imagery 1720 and the auxiliary content 1738. The light projector 1710 and the extraction hologram 1716 emit within a cone of light 1728.

Although FIG. 17 illustrates the injection hologram 1712 and the extraction hologram 1716 to be on a same side of the substrate 1718, embodiments of the present disclosure are not limited as such. For instance, the injection hologram 1712 and the extraction hologram 1716 can be on opposite sides of the substrate 1718. Generally, the injection hologram 1712 is coupled to an input surface of the substrate 1718 by, for instance, being mounted to and attached to the input surface. Likewise, the extraction hologram 1716 is coupled to an output surface of the substrate 1718 by, for instance, being mounted to and attached to the output surface. The input surface corresponds to a surface where light from the light projector 1710 is received. The output surface corresponds to a surface from which light is emitted from the substrate 1718.

The optical combiner 1734 can form the eye box 1726 in the horizontal and vertical directions. The eye box 1726 can correspond to the vertical and horizontal distance where the viewer's pupil receives all the angles emitted by the light projector 1710. As the viewer's pupil moves outside the eye box 1726, the image becomes degraded. Eye relief 1722 is the distance between the substrate surface and the entrance pupil of the viewer's eye 1724. For maximum comfort, this distance should be larger than a minimum threshold distance. The field-of-view 1730 is the angular size of the image determined by the geometric relationship between the size of the extraction hologram 1716 and the distance between the pupil and the surface of the extraction hologram 1716.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of incoupling into substrate modes (light propagating through total internal reflection).

A properly designed optical combiner 1734 can have a high transmission (e.g., at least 80%) of the light from the real imagery 1720, a large auxiliary field of view diagonally, vertically and horizontally, a large eye box, and an ability to accept the auxiliary content 1738 from broadband light emitting diode RGB inputs. To build such an optical waveguide combiner, several issues can be addressed.

Light projectors are designed to achieve a certain white balance (the ratio between the primary emission wavelengths that provide a natural looking image-white balance is typically expressed in degrees Kelvin of a black body source producing the same spectral distribution). The optical combiner 1734 maintains the white balance of the light projector 1710 along the optical path to the viewer's eye 1724.

While either transmission or reflection holographic optical element can be implemented in the display to produce a large field of view, reflection holographic optical elements can provide a large horizontal field of view. Transmission holographic optical elements can be used in the optical combiner 1734 when the angular requirements on the field of views are smaller. Both horizontal and vertical field of views can be limited by the distance from the aperture stop of the light projector 1710 to the center of the extraction hologram 1716. In order for NTE glasses to accommodate size, weight, and power restrictions, the size of the light projector 1710 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the optical combiner 1734. This is because the light forming the image experiences multiple bounces in the direction of the extraction hologram 1716 and multiple light extractions can expand the eye box 1726. In particular, a portion of the light can be extracted and output by each of the diffraction gratings of the extraction hologram 1716.

The arrangement of components of the optical system 1700 is provided for illustrative purposes. Different possible of such components are possible. For example, the eye box 1726 can be centered, positioned near center, or positioned at a particular distance from the center of the optical combiner 1734.

Figure 18:
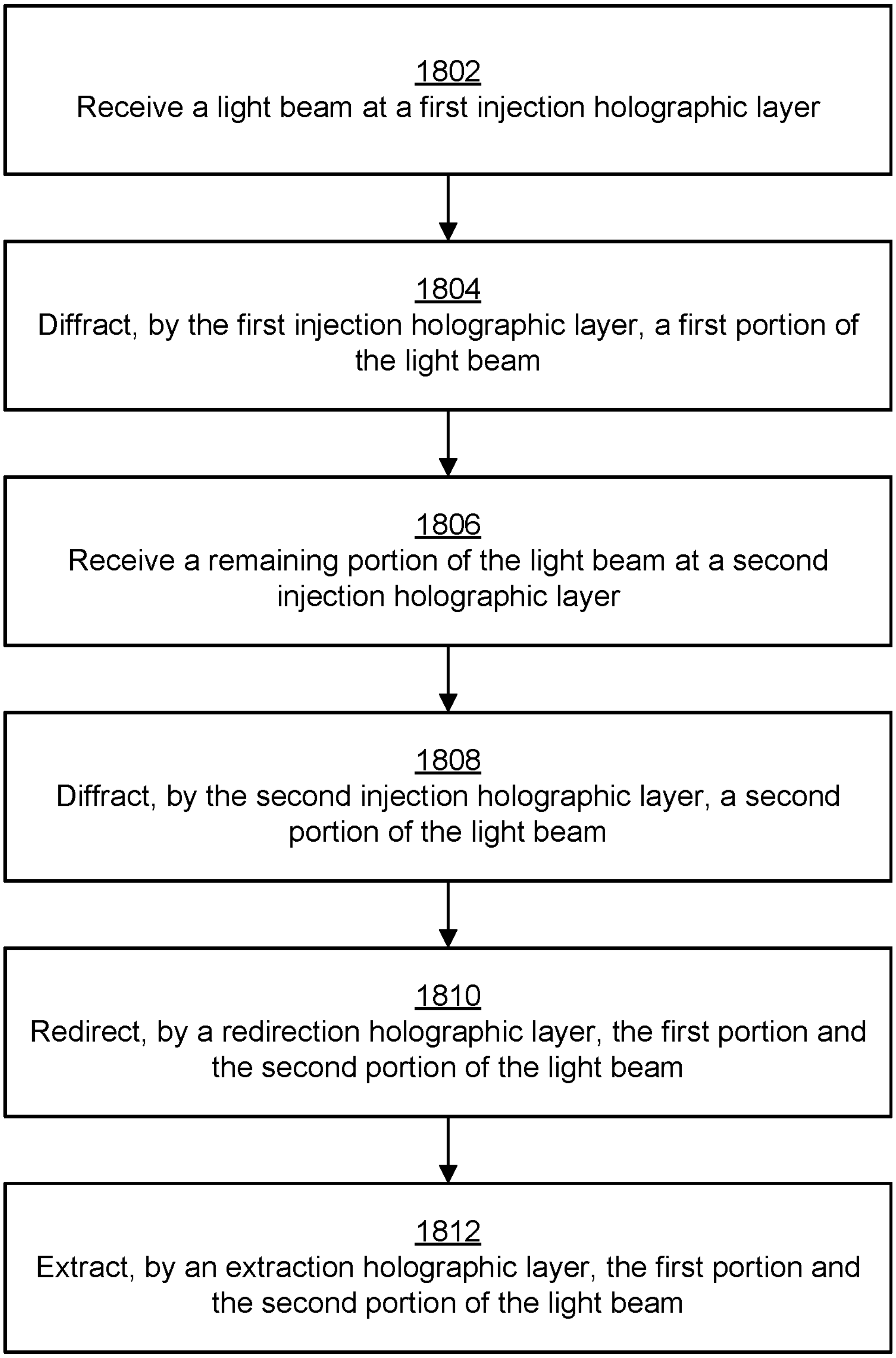
FIG. 18 illustrates an example of a flow for light propagation of an optical waveguide system in accordance with an embodiment of the present disclosure.

FIG. 18 illustrates an example of a flow for light propagation of an optical waveguide system in accordance with an embodiment of the present disclosure. An optical waveguide system (e.g., optical waveguide system 210 in FIG. 2) is described as performing the operations of the example flow. While the operations are illustrated in a particular order, it should be understood that no particular order.

In an example, the flow includes operation 1802, where the optical waveguide system receives a light beam at a first injection holographic layer. The first injection holographic layer may be formed in a first photopolymer film that is disposed in or on an optical waveguide substrate. The light beam can be received from a light projector. A first surface of the first injection holographic layer can receive the light beam.

In an example, the flow includes operation 1804, where the optical waveguide system diffracts, by the first injection holographic layer, a first portion of the light beam. The first portion of the light beam can be diffracted from the first surface of the first injection holographic layer into the optical waveguide substrate. The first portion is diffracted from the first surface at a diffraction angle relative to a surface of the optical waveguide substrate. The first portion represents a first image. A remaining portion of the light beam is output from a second surface of the first injection holographic layer that is opposite and parallel to the first surface.

In an example, the flow includes operation 1806, where the optical waveguide system receives the remaining portion of the light beam at a second injection holographic layer. The second injection holographic layer may be formed in a second photopolymer film that is disposed in or on the optical waveguide substrate. The second injection holographic layer can be separated from the first injection holographic layer by a distance. The remaining portion of the light beam can be received at a third surface of the second injection holographic layer.

In an example, the flow includes operation 1808, where the optical waveguide system diffracts, by the second injection holographic layer, a second portion of the light beam. The second portion of the light beam can be diffracted from the third surface of the second injection holographic layer. The second portion is diffracted into the optical waveguide substrate from the third surface at the diffraction angle relative to a surface of the optical waveguide substrate. The second portion represents a second image that is a duplicate of the first image.

In an example, the flow includes operation 1810, where the optical waveguide system redirects, by a redirection holographic layer, the first portion and the second portion of the light beam. The redirection holographic layer is coupled to the optical waveguide substrate and redirects the first portion and the second portion of the light beam towards an extraction holographic layer.

In an example, the flow includes operation 1812, where the optical waveguide system extracts, by the extraction holographic layer, the first portion and the second portion of the light beam. The extraction holographic layer is coupled to the optical waveguide substrate and extracts the first portion and the second portion as an output light beam that represents an image that is a duplicate of the first image and the second image. The image is brighter than the first image or the second image individually.

Figure 19:
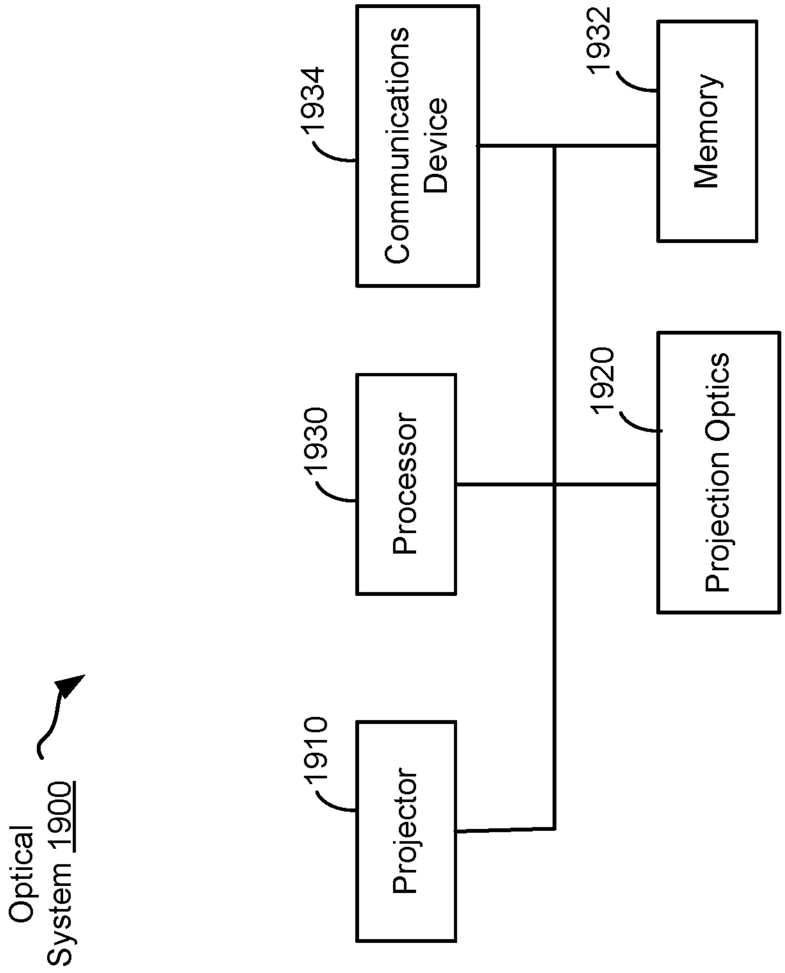
FIG. 19 illustrates a schematic diagram of an optical system in accordance with an embodiment of the present disclosure.

FIG. 19 illustrates a schematic diagram of an optical system 1900 system in accordance with an embodiment of the present disclosure. As illustrated in FIG. 19, the optical system 1900 supports a mixed reality device, such as any of the devices described herein above. In an example, the optical system 1900 includes a projector 1910, which can be implemented as discussed in relation to the light projectors discussed herein above. The optical system 1900 includes an optical waveguide system including holographic layers. The optical system 1900 can also include projection optics 1920 operable to direct light produced using projector 1910.

The optical system 1900 additionally includes a processor 1930 (e.g., a microprocessor), a memory 1932, and a communications device 1934. The memory 1932, also referred to as storage media or non-transitory computer readable storage media, stores computer-readable instructions of an application, where the computer-readable instructions are executable by the processor 1930 to run the application.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An optical waveguide system comprising:

an optical waveguide substrate;

a first injection holographic layer coupled to the optical waveguide substrate, the first injection holographic layer having a first surface and a second surface opposite and parallel to the first surface, the first injection holographic layer configured to receive a light beam at the first surface and inject a first portion of the light beam into the optical waveguide substrate by at least diffracting the first portion from the first surface at a diffraction angle relative to a surface of the optical waveguide substrate, the first portion representing a first image, a remaining portion of the light beam being output from the second surface;

a second injection holographic layer coupled to the optical waveguide substrate, separated from the first injection holographic layer by a distance, the second injection holographic layer having a third surface that is parallel to the first surface and that is separated from the second surface by the distance, the second injection holographic layer configured to receive the remaining portion of the light beam at the third surface and inject a second portion of the light beam into the optical waveguide substrate by at least diffracting the second portion from the third surface at the diffraction angle such that the second portion propagates within the optical waveguide substrate along a propagation path parallel to that of the first portion, the second portion representing a second image that is a duplicate of the first image; and an extraction holographic layer coupled to the optical waveguide substrate and configured to extract the first portion and the second portion from the optical waveguide substrate as an output light beam, the output light beam representing an image that is a duplicate of the first image and that is brighter in luminosity than the first image or the second image individually.

2. The optical waveguide system of claim 1, wherein a first edge and a second edge of the first injection holographic layer align with a corresponding first edge and a corresponding second edge of the second injection holographic layer such that the first injection holographic layer and the second injection holographic layer are parallel to each other and fully overlap, and wherein the first injection holographic layer is characterized by at least one optical property that is different from that of the second injection holographic layer.

3. The optical waveguide system of claim 1, wherein the first injection holographic layer comprises a first edge and a second edge defined between the first surface and the second surface, wherein the second injection holographic layer comprises a fourth surface that is opposite and parallel to the third surface, wherein the second injection holographic layer further comprises a third edge and a fourth edge defined between the third surface and the fourth surface, wherein the first edge is aligned with the third edge, and wherein the second edge is aligned with the fourth edge.

4. A system comprising:

an optical waveguide substrate;

a first holographic layer coupled to the optical waveguide substrate and configured to diffract a first portion of a light beam at a diffraction angle relative to a surface of the optical waveguide substrate, a remaining portion of the light beam being output from the first holographic layer without being diffracted by the first holographic layer; and a second holographic layer coupled to the optical waveguide substrate, separated from the first holographic layer by a first distance, and configured to receive some or all of the remaining portion of the light beam and diffract a second portion of the light beam at the diffraction angle such that the second portion propagates within the optical waveguide substrate along a propagation path parallel to that of the first portion.

5. The system of claim 4, wherein the first holographic layer and the second holographic layer are parallel to each other and to the surface of the optical waveguide substrate, wherein the light beam is received at the surface of the optical waveguide substrate.

6. The system of claim 5, wherein at least a first edge of the first holographic layer is aligned with a second edge of the second holographic layer.

7. The system of claim 4, wherein the first holographic layer includes a first surface configured to receive the light beam, wherein the second holographic layer includes a second surface configured to receive the remaining portion of the light beam, wherein the first surface and the second surface are not parallel to each other.

8. The system of claim 4, wherein the first holographic layer is formed in a photopolymer film disposed on or in the optical waveguide substrate, wherein the photopolymer film includes a first section and a second section, wherein the first holographic layer is formed in the first section and has a first diffraction grating, wherein the second section has a second diffraction grating different than the first diffraction grating such that light passes through the second section without diffraction.

9. The system of claim 4, wherein the first holographic layer and the second holographic layer are of a same holographic type and at least partially overlap, wherein the holographic type is one of an injection holographic layer, a redirection holographic layer, or an extraction holographic layer.

10. The system of claim 4, wherein the first holographic layer is recorded in a photopolymer film disposed on or in the optical waveguide substrate, wherein the photopolymer film encapsulates only the first holographic layer and does not extend beyond edges of the first holographic layer.

11. The system of claim 4, wherein the first holographic layer is formed in a first photopolymer film and the second holographic layer is formed in a second photopolymer film, and wherein the system further comprises an adhesive layer disposed between the first photopolymer film and the second photopolymer film, wherein the first holographic layer has a first refractive index, wherein the adhesive layer has a second refractive index such that no total internal reflection (TIR) occurs between the first photopolymer film and the second photopolymer film.

12. The system of claim 4, wherein the first holographic layer comprises a first injection holographic layer, wherein the second holographic layer comprises a second injection holographic layer, and further comprising:

a third injection holographic layer configured for light diffraction at the diffraction angle; and at least one of: a redirection holographic layer or an extraction holographic layer, wherein the first injection holographic layer is formed in a first section of a first photopolymer film, and wherein the redirection holographic layer or the extraction holographic layer is formed in a second section of the first photopolymer film or in a second photopolymer film.

13. An apparatus comprising:

a light source configured to emit a light beam; and an optical waveguide system that comprises:

an optical waveguide substrate;

a first holographic layer coupled to the optical waveguide substrate and configured to diffract a first portion of the light beam at a diffraction angle relative to a surface of the optical waveguide substrate, a remaining portion of the light beam being output from the first holographic layer without being diffracted by the first holographic layer; and a second holographic layer coupled to the optical waveguide substrate, separated from the first holographic layer by a first distance, and configured to receive some or all of the remaining portion of the light beam and diffract a second portion of the light beam at the diffraction angle such that the second portion propagates within the optical waveguide substrate along a propagation path parallel to that of the first portion.

14. The apparatus of claim 13, wherein the first portion represents a first image, wherein the second portion represents a second image that is a duplicate of the first image, and wherein the optical waveguide system further comprises:

an extraction holographic layer coupled to the optical waveguide substrate and configured to extract the first portion and the second portion from the optical waveguide substrate as an output light beam, the output light beam representing an image that is a duplicate of the first image and that is brighter in luminosity than the first image or the second image individually.

15. The apparatus of claim 13, wherein the first holographic layer and the second holographic layer differ at least in optical absorption, diffraction efficiency, diffraction index, diffraction grating, grating pitch, or thickness.

16. The apparatus of claim 13, wherein the first holographic layer and the second holographic layer are parallel to each other and to the surface of the optical waveguide substrate.

17. The apparatus of claim 16, wherein a first edge and a second edge of the first holographic layer align with a corresponding first edge and a corresponding second edge of the second holographic layer such that the first holographic layer and the second holographic layer fully overlap.

18. The apparatus of claim 13, wherein the first holographic layer is configured to diffract the first portion that is within a first wavelength band, wherein the second holographic layer is configured to diffract the second portion that is within a second wavelength band different than the first wavelength band.

19. The apparatus of claim 13, wherein the first holographic layer has a first surface that is parallel to the surface of the optical waveguide substrate and has a second surface that is opposite and parallel to the first surface, wherein the second holographic layer has a third surface that is parallel to the first surface, wherein the light beam is received at and diffracted from the first surface, wherein the remaining portion of the light beam is received at the third surface, and wherein the second portion of the light beam is diffracted from the third surface.

20. The apparatus of claim 19, wherein the light beam is received at an injection angle relative to the surface of the optical waveguide substrate, wherein the remaining portion is received at the third surface at the injection angle, wherein no total internal reflection (TIR) occurs between the second surface and the third surface.

* * * * *